June 27, 1967 M. H. LILL Re. 26,232
VEHICLE SUPPORTING RACK
Original Filed Aug. 18, 1961 8 Sheets-Sheet 1
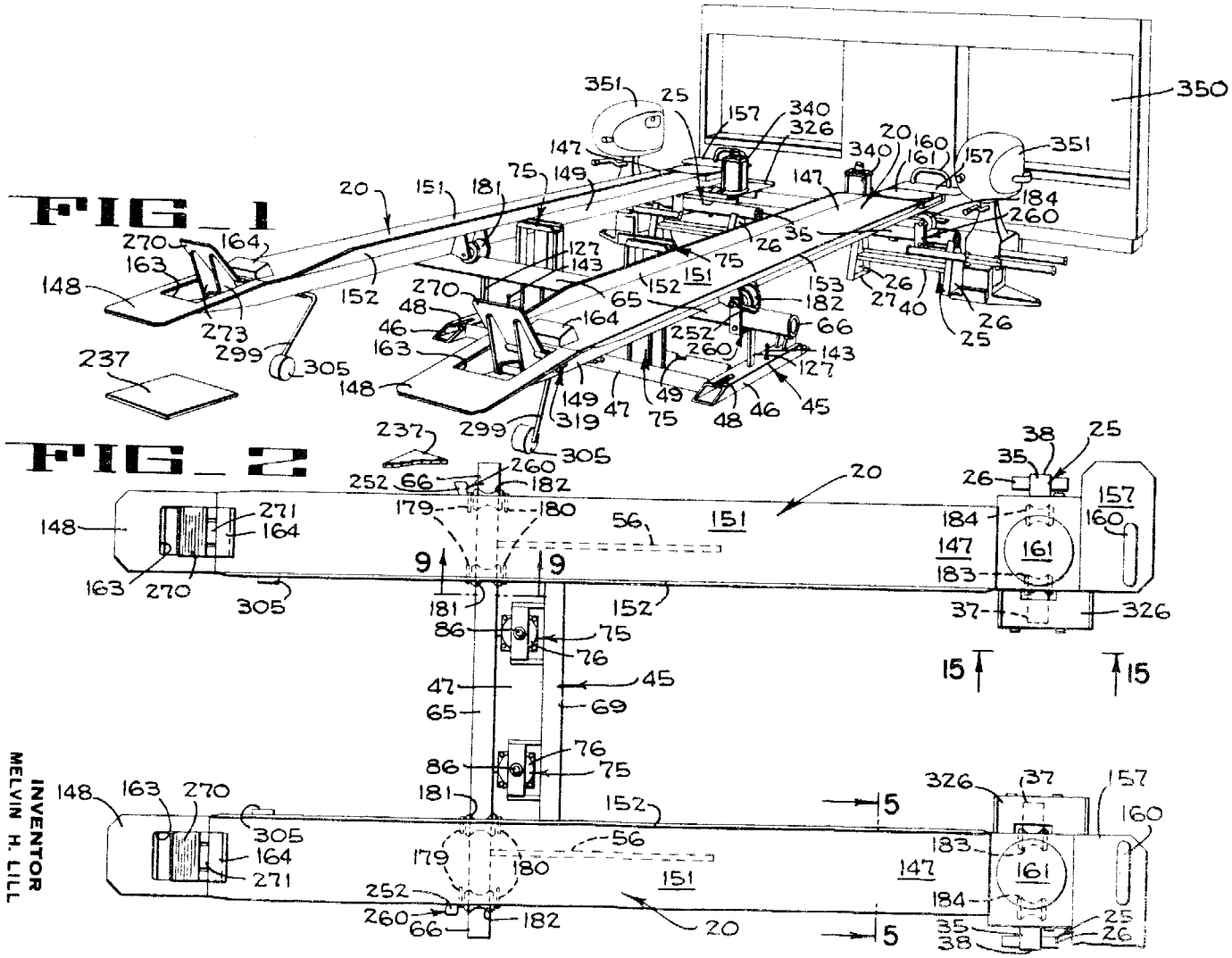
INVENTOR
MELVIN H. LILL
BY Hugo E. Hoffmeister
ATTORNEY

VEHICLE SUPPORTING RACK

Original Filed Aug. 18, 1961 8 Sheets-Sheet 2

INVENTOR
MELVIN H. LILL

BY Hans G. Hoffmeister
ATTORNEY

VEHICLE SUPPORTING RACK

Original Filed Aug. 18, 1961 8 Sheets-Sheet 3

INVENTOR
MELVIN H. LILL

BY Hans G. Hoffmeister
ATTORNEY

June 27, 1967 M. H. LILL Re. 26,232
VEHICLE SUPPORTING RACK
Original Filed Aug. 18, 1961 8 Sheets-Sheet 4
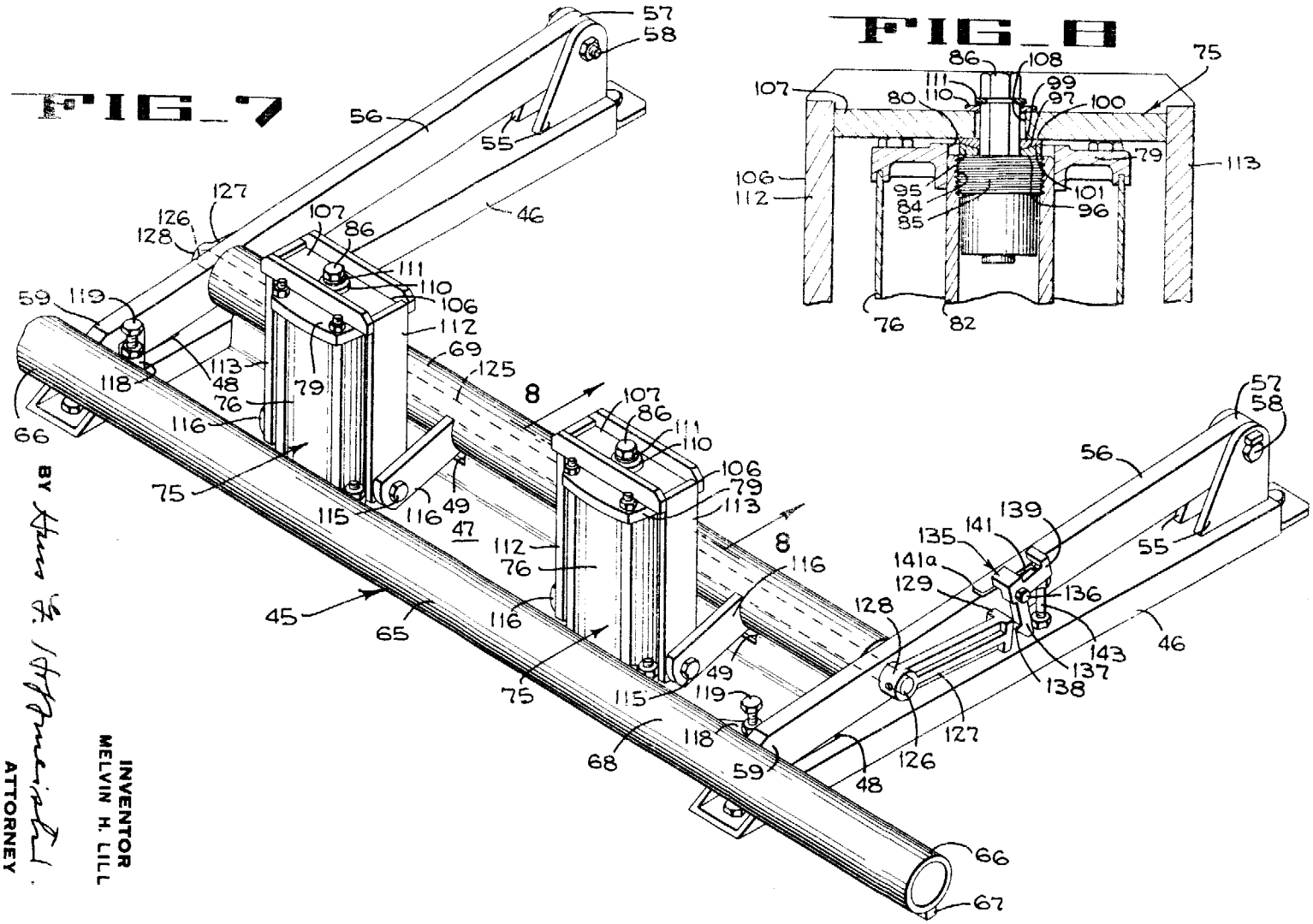
INVENTOR
MELVIN H. LILL
BY Hans G. Hoffmeister
ATTORNEY

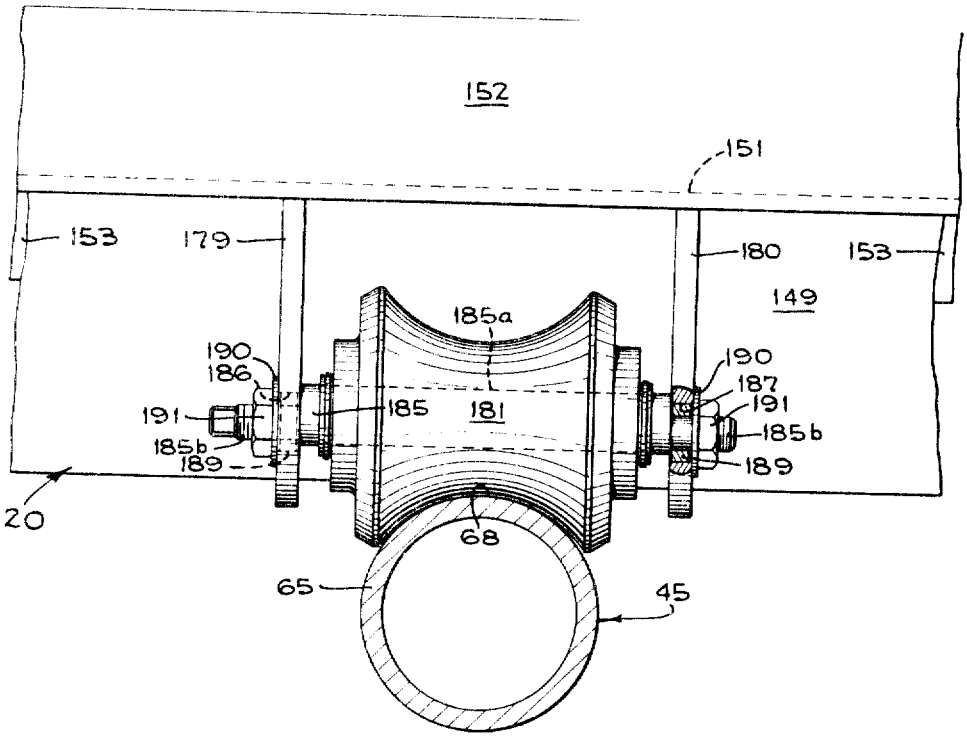
FIG_9
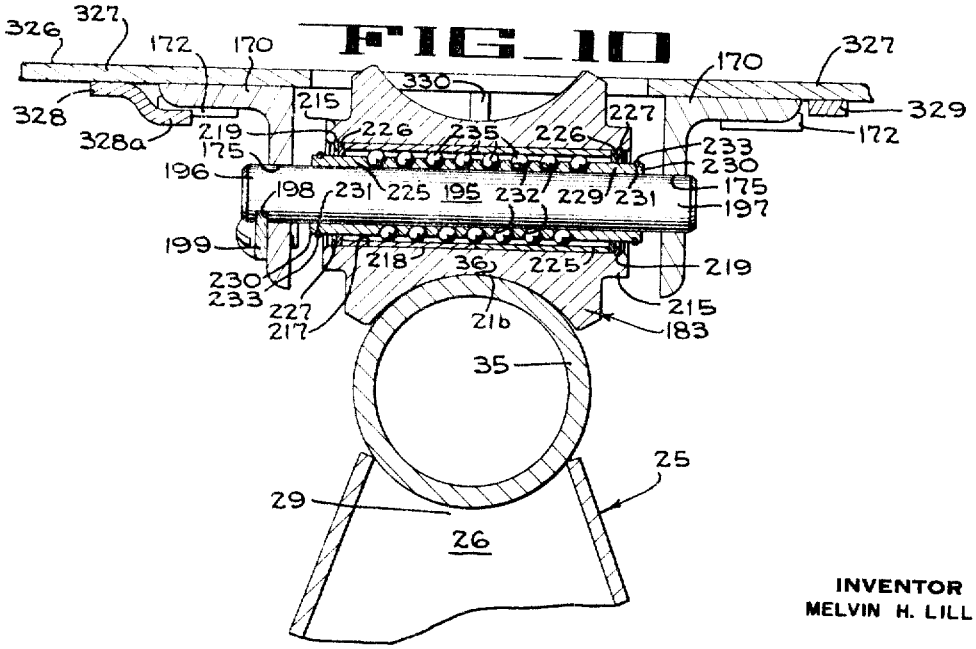
INVENTOR
MELVIN H. LILL
BY Hans G. Hoffmeister
ATTORNEY

VEHICLE SUPPORTING RACK

Original Filed Aug. 18, 1961 8 Sheets-Sheet 6

INVENTOR
MELVIN H. LILL

BY Hans G. Hoffmeister
ATTORNEY

VEHICLE SUPPORTING RACK

Original Filed Aug. 18, 1961 8 Sheets-Sheet 1

INVENTOR
MELVIN H. LILL

BY Hans G. Hoffmeister
ATTORNEY

VEHICLE SUPPORTING RACK

Original Filed Aug. 18, 1961 8 Sheets-Sheet

INVENTOR
MELVIN H. LILL

BY Hans G. Hoffmeister
ATTORNEY

United States Patent Office

Re. 26,232
Reissued June 27, 1967

26,232
VEHICLE SUPPORTING RACK

Melvin H. Lill, Lansing, Mich., assignor to FMC Corporation, San Jose, Calif., a corporation of Delaware Original No. 3,190,395, dated June 22, 1965, Ser. No. 132,473, Aug. 18, 1961. Application for reissue Aug. 12, 1966, Ser. No. 582,174

43 Claims. (Cl. 187—8.67)

Matter enclosed in heavy brackets [ ] appears in the original patent but forms no part of this reissue specification; matter printed in italics indicates the additions made by reissue.

The present invention pertains to a vehicle supporting rack and more particularly to an improved mounting for elongated runways of a rack to adapt the runways for elevational movement between an inclined vehicle ascending and descending position and a level vehicle-supporting position.

It is known to support an automobile on a rack in a generally horizontal work position for checking wheel alignment, for lubrication, for inspection and repair, and the like. Although not limited thereto, the subject rack is conveniently described in connection with its use for checking wheel alignment. In examining automobile wheels for proper alignment, as with apparatus of the type disclosed in the Carrigan Patent No. 2,601,262, granted June 24, 1952, the automobile is usually supported on a pair of elevated runways. Because of their association with the wheel alignment apparatus, these runways are conventionally mounted in a horizontal position perpendicular to a projection screen in front of the runways. The runways support the automobile so that its wheels are tangential to a common horizontal plane normal to the screen.

In the past it has been conventional to drive an automobile upwardly along inclined ramps onto runways fixed in elevated, level position. These ramps have been relatively long to provide for gradual ascent of the automobile and, therefore, have added undesirably to the space requirements for the apparatus. While pit installations might eliminate the need for ramps, pits are not generally employed because of their excessive cost, immobility, and inconvenience, as well as their general unsuitability for wheel alignment apparatus of the type referred to above.

With alignment apparatus of the type discussed above, it is also necessary to adjust the runways transversely of each other for accommodating vehicles of various tread widths and suspension systems, and for locating the vehicles in desired alignment-checking position. Such transverse movement includes adjustment of the rear ends of the runways relative to their forward ends, as well as movement of the runways along rectilinear paths normal to the runways. Whereas it has been known to mount runways for elevational pivotal movement between inclined and level positions, such runways have not accommodated the desired transverse adjustments.

It is significant in the present invention, therefore, that the runways are mounted on rollers; that these rollers ride on rails; that the rails extend beneath and transversely of the front and rear ends of the runways; that one of the rails is mounted for elevational movement for raising and lowering the runways between inclined and level positions; and that the rollers not only enable transverse adjustment of the runways but also accommodate their elevational movement between said positions.

Furthermore, in employing a supporting rack for checking wheel alignment, the runways must be precisely level. In the subject rack, therefore, the rails must be maintained level in order to support the runways in a similar manner. In view of this, it is also significant in the present invention that a lift mechanism supports the elevating rail directly beneath the points of application of the load, said loading points being directly under the runways, not between the runways. Support at these points minimizes elastic deformation of the elevating rail.

As will be understood more fully from the following description, mounting and control mechanisms for runway safety support legs and for runway guards are also of importance in the present invention.

Accordingly, it is an object of the present invention to provide an improved vehicle supporting rack.

Another object is to provide a pair of elongated wheel runways which are movable transversely of their length and which are elevationally adjustable between an inclined ascending and descending position and a level wheel-checking position.

Another object is to provide wheel runways which accommodate vehicles of various tread widths and suspension systems and which facilitate the checking of wheel alignment.

Another object is to provide runways which are mounted for limited free play longitudinally thereof when level but whereby such free play is precluded when the runways are inclined.

Another object is to provide an economical and portable vehicle supporting rack which occupies a minimum of space and which does not require a pit installation.

Another object is to provide safety devices for wheel runways which preclude inadvertent lowering of the runways as well as inadvertent rolling of a vehicle off the runways.

Another object is to provide a runway safety support leg and a latch therefor wherein the leg is automatically unlatched when the runway is lowered whereby such leg is conditioned to drop into a runway supporting position when the runway is subsequently elevated.

Another object is to provide a guard control mechanism which automatically raises a guard to a guarding position when the runway is elevated, which does not retract the guard when the runway is lowered or interfere with the lowering of the runway, and which is operable to retract the guard only by manual or mechanical actuation independently of the elevational, or other movement, of the runway.

These, together with other objects and advantages, will become more fully apparent from the following description and accompanying drawings, in which:

FIG. 1 is a perspective of a wheel alignment apparatus including an adjustable vehicle supporting rack embodying the principles of the present invention.

FIG. 2 is an enlarged plan of the vehicle supporting rank illustrated in FIG. 1.

FIG. 7 is an enlarged, fragmentary isometric of a lift mechanism employed in the rack of the subject invention.

FIG. 8 is a fragmentary, enlarged vertical section taken on line 8—8 in FIG. 7.

FIG. 9 is an enlarged transverse section taken on line 9—9 in FIG. 2.

FIG. 10 is an enlarged, fragmentary section taken on line 10—10 in FIG. 5.

Figure 15:
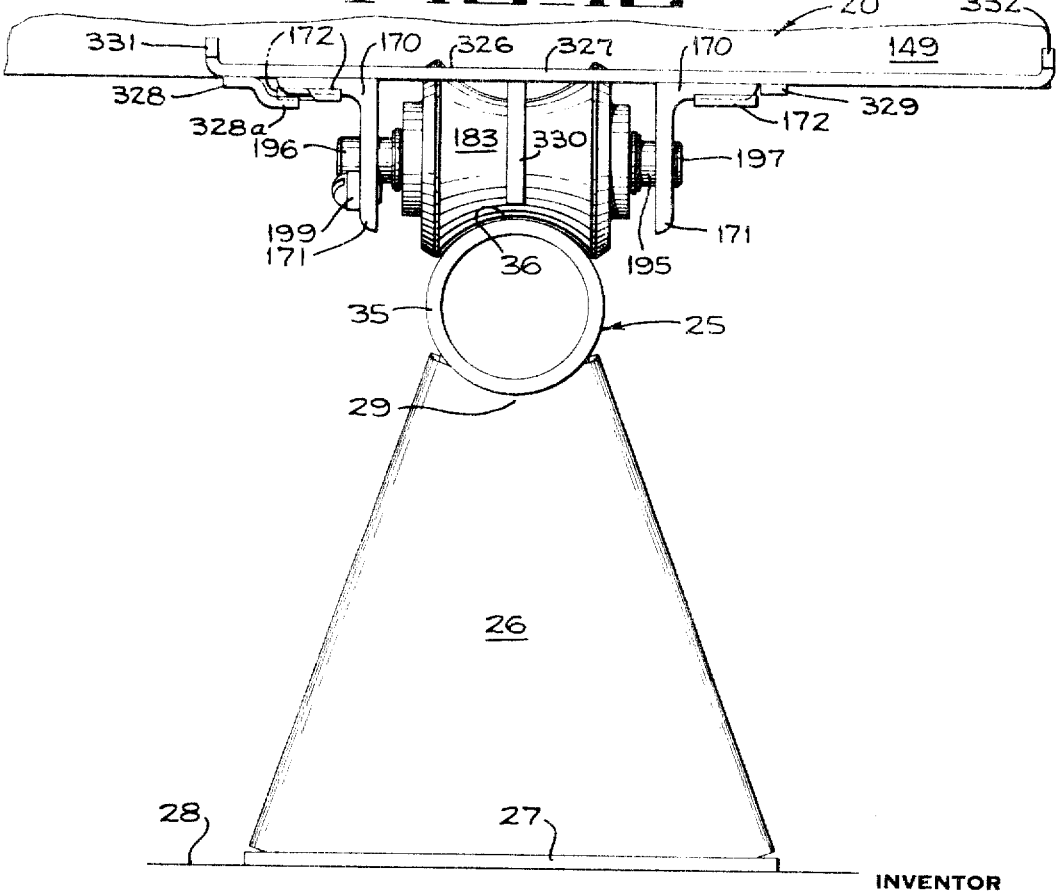
FIG. 15 is an enlarged side elevation as seen from a position indicated by line 15—15 in FIG. 2.

The vehicle supporting rack of the present invention comprises a pair of elongated runways 20 (FIG. 1) each of which is supported at its forward end on a pedestal 25. Each pedestal provides spaced, upstanding, triangular inner and outer brackets 26 (FIG. 5), each bracket having bottom edges 27 bolted, or otherwise secured, to a floor 28, and having an upper apex 29 (FIG. 15).

Each pedestal 25 also includes a cylindrical front support rail 35 (FIG. 1) connected to the apices 29 of the brackets 26, the two rails 35 being in axial alignment with each other. Each rail has an upper convex surface 36 (FIGS. 5 and 6) concentric with its longitudinal axis, an inner end 37, and an outer end 38. Stop blocks 39 are secured to the under side of each rail 35 between the brackets 26. A tool tray 40 rigidly interconnects the two brackets 26 of each pedestal in downwardly spaced relation to the corresponding support rail 35.

The rearward ends of the runways 20 are supported on a rear transverse base 45 (FIGS. 1 and 2) that is disposed in rearwardly spaced relation to the pedestals 25. The base provides two spaced, substantially parallel, longitudinal base portions 46 (FIG. 1) interconnected by a transverse base portion 47. Each of the base portions 46 preferably has a box section and has a rear longitudinal slot 48. The transverse base portion 47 is channel-shaped and has a plurality of upper notches 49 (FIG. 7) in one upstanding arm.

Pairs of spaced ears 55 (FIG. 7) are rigidly connected to, and project upwardly from, forward ends of each of the longitudinal base portions 46. Elongated lift arms 56 have front ends 57 individually pivotally connected between the pairs of ears by pins 58, and also have opposite rear ends 59. The lift arms are thus mounted in substantially parallel relation to each other and in transversely spaced relation for elevational pivotal movement about a common axis extended transversely of the rack. The lift arms are pivotal about said axis between upper and lower positions. It is also to be observed that the arms 56 (FIG. 7) are located in vertical planes passing through the slots 48 in their respective longitudinal base portions so that the rear ends of the arms are received by the slots in the lower positions of the arms.

A cylindrical rear support rail 65 provides opposite outer end portion 66 rigidly connected to the rear ends 59 of the lift arms 56. The rear rail is thereby positioned in rearwardly spaced, substantially parallel relation to the front support rails 35. A stop block 67 is connected to the underside of each end portion of the rear rail in outwardly spaced relation to the lift arms. The rear support rail 65 also has an upper convex surface 68 concentric to the longitudinal axis of the rail. An elongated tubular lift bar 69, which is substantially parallel to rail 65, rigidly interconnects the lift arms, being connected to said arms at points intermediate the ends 57 and 59 so that the bar is in forwardly spaced, substantially parallel relation to the rear support rail. The lift bar 69 helps to keep the rear rail 65 in a horizontal position, parallel to the pivot pins 58.

Two rams 75 (FIG. 7) are used to actuate the lift arms, and each ram includes a cylinder 76 (FIG. 8) having a lower end mounted on the transverse base portion 47 and an upper end wall 79 providing an axial bore 80. Tubular piston rods 82 are slidably fitted in the bores of the cylinders provide open, internally threaded upper ends 84. Externally threaded plugs 85 are threaded into the upper ends of the piston rods for adjusting the strokes of the piston rods. Hex-shaped stems 86 are outwardly extended from the plugs in axial alignment with the cylinders. Hoses 88 (FIG. 16) are individually connected to the cylinders and are interconnected by a union 89. Preferably, a three-way double solenoid valve 90 interconnects the union and a source of fluid pressure, such as an air compressor 91. The valve is adapted to hold its position after the momentary energization of either solenoid 92. A main control valve 93 is also connected to the source.

A lower collar 95 (FIG. 8) circumscribes each stem 86, said collar having a lower flat face 96 secured to the plug 85, and an upper spherically concave face 97. An upper collar 99, which loosely circumscribes the stem 86, is disposed above each lower collar 95. Each upper collar 99 has a flat face 100, and a lower spherically convex surface 101, the convex surface of each upper collar being complementarily and slidably seated on the upper concave face of the associated lower collar 95.

Inverted, U-shaped yokes 106 (FIGS. 7 and 8) are disposed over the cylinders 76 and include upper cross pieces 107 which have cylindrical apertures 108 individually fitted over the stems 86. As seen in FIG. 8, these apertures are diametrically larger than the stems to allow limited movement of the cross pieces transversely of the stems. The cross pieces are secured to the upper faces 100 of their respective collars 99. Washers 110 circumscribe the stems above the cross pieces, and retaining rings 111 are secured to the stems above the washers. The yokes also include spaced parallel, inner and outer legs 112 and 113. The legs are rigidly connected to their respective cross pieces on opposite sides of the rams 75 and are downwardly extended alongside their associated cylinders 76. Pins 115 are connected to lower ends of the legs and are outwardly extended therefrom in rearwardly spaced, substantially parallel relation to the lift bar 69. A pair of links 116 is associated with each ram and has rear ends individually pivotally attached to the pins 115 and front ends rigidly connected to the lift bar.

The lift arms 56 are, therefore, adjustable in a vertical direction as a result of upward expansion and downward retraction of the piston rods 82 in their cylinders 76. The loose fit of the cross pieces 107 on the stems 86 and the slidable movement of the upper collars 99 on the lower collars 95 accommodate pivotal movement of the lift arms notwithstanding vertical rectilinear movement of the piston rods. It is also significant that the lift bar 69 absorbs distortion caused by the lifting effort of the rams 75, and that the rear support rail 65 is freed of such distortion or elastic deformation. In this manner the rear rail is maintained in a precisely level position, coplanar with the front rails 35. Plates 118 interconnect the rear rail 65 and the lift arms adjacent the point where the arms are secured to the rear rail. Adjustable stop bolts 119 are threaded through the plates 118 and have lower ends engageable with the longitudinal base portions 46 in the lower positions of the lift arms.

An elongated shaft 125 (FIG. 7) extends through the tubular lift bar 69 coaxially therewith and provides opposite ends 126 that are freely rotatably received in the lift arms 56 and project outwardly therefrom. Safety support legs 127 have inner ends 128 rigidly connected to the outer ends of the shaft 125. The two legs 127 are radially extended from the shaft in a common radial plane and are gravitationally swingable relative to the lift arms from a retracted position (FIG. 7), extended alongside of the lift arms when the arms are in their lower position, to a runway-supporting position (FIG. 3) angularly downwardly extended from the lift arms when the lift arms are in their upper position, the outer ends 129 of the support legs 127 being adapted to rest on the bases 46 in said latter position.

An L-shaped latch 135 (FIGS. 3, 4 and 7) is pivotally connected by a pin 136 to one of the lift arms 56 for pivotal movement about an axis parallel to the shaft 125. With the associated safety leg 127 in the retracted position of FIG. 7, the pin 136 is disposed adjacent the outer abutment end 129 of the leg. The latch has a latching arm 137 including a finger 138 adapted to hook over the abutting end of the leg in its retracted position, and a releasing arm 139 perpendicular to the latching arm. The latch is pivotal between a latching position (FIG. 3), wherein the finger is disposed in latching engagement with the leg, and an unlatched position (FIGS. 4 and 7) wherein the finger is spaced forwardly of the abutting end of the leg. A torsion spring 141 which has one end 141a engaging the upper surface of arm 56, is mounted on the pin 136 and is connected to the latch for yieldably urging the latch into its latching position. An unlatching stud 143 is rigidly secured to the base portion 46 and projects upwardly therefrom adjacent to the latch and is engageable with the releasing arm 139 when the associated lift arm is lowered. Accordingly, the latch is automatically moved to its unlatching position when the arm 56 moves downwardly toward the base 46.

Each of the runways 20 of the rack has a front mounting end portion 147 (FIGS. 1 and 2) and a rear vertically movable end portion 148. The runways are positioned over the transverse rails 35 and 65 with the front end portions extended over the front rails 35 and with the rear end portions extended over the rear rail 65. The runways are in transversely spaced relation to each other and each runway is located above one of the lift arms 56. Each runway includes a lower, upright channel member 149 (FIG. 5) extended longitudinally of the runway. An upper wheel plate 151 overlays and is secured to the channel member; the wheel plate provides an upwardly extended inner flange 152 and a downwardly turned outer flange 153. A U-shaped saddle 155 (FIG. 3) is welded to and extends forwardly from the wheel plate 151 and has spaced front and rear flanges extended transversely of the channel member. A step plate 157 is welded to the front flange of the saddle 155 and projects forwardly therefrom and transversely outwardly from the channel member as seen in FIG. 2. Each step plate includes a pair of upwardly opening sockets, not shown, into which the legs of a U-shaped wheel stop 160 is releasably fitted. Turntables 161 are received in the saddles and are mounted on the runways for rotation, in any well-known manner to permit pivoting of the wheels during the wheel aligning operation. The wheel plates have rear, substantially rectangular openings 163 (FIG. 1), and an abutment member 164 is secured to each plate forwardly of the opening 163.

Figure 4:
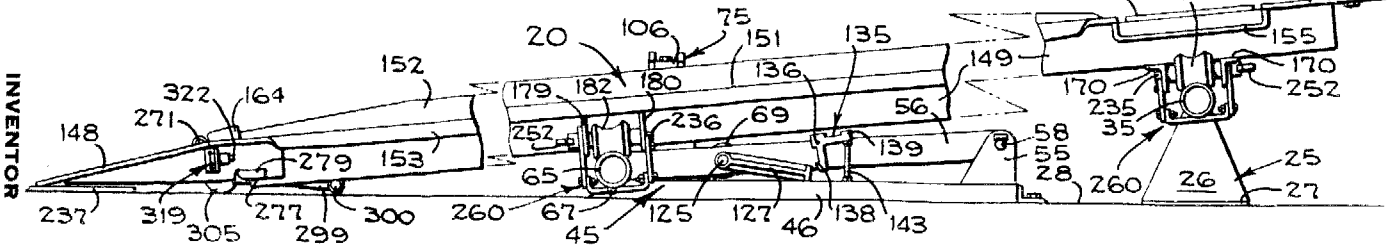
FIG. 4 is an enlarged side elevation of the subject rack in an inclined position with intermediate portions thereof being broken away and with the runway guard in a retracted position.
Figure 5:
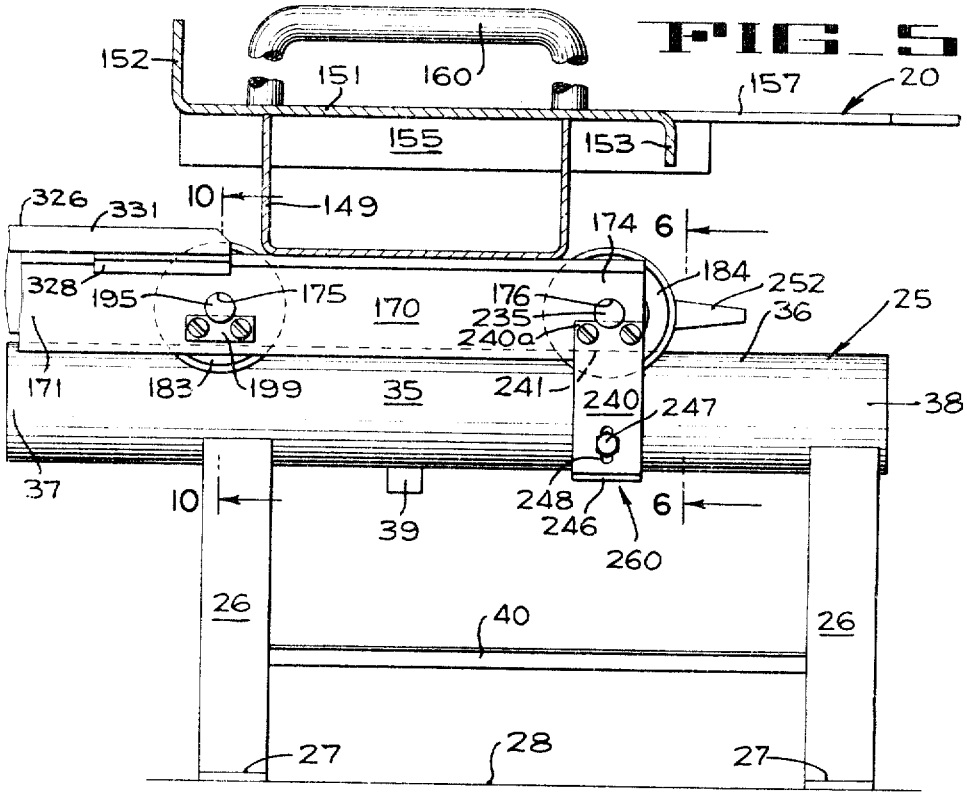
FIG. 5 is a fragmentary, enlarged transverse section taken on line 5—5 in FIG. 2 with portions of a wheel stop being broken away.

A pair of front roller mounting brackets 170 (FIGS. 4, 5, 6 and 15) of angulated cross-section are rigidly secured under and to the channel member 149 of each runway 20. The brackets are extended transversely of the runways, but the brackets on each runway are spaced from each other longitudinally of their respective runway. As seen in FIG. 5, the front brackets have inner ends 171 spaced inwardly from the inner flange 152 of the associated runway. Stop flanges 172 (FIG. 15) are secured to the inner ends of the front brackets. The brackets provide outer ends 174 (FIG. 5) terminating inwardly of the outer flange 153 of the runway. Also, each of the two front brackets of each runway has an inner and an outer hole 175 and 176, the inner holes 175 being in alignment with each other longitudinally of their runway as seen in FIG. 6, and the outer holes 176 also being in alignment longitudinally of their runway.

Referring to FIG. 2, it will be noted that four pairs of brackets 179 and 180 are provided at the rearward ends of the runways 20, one pair of brackets being mounted on the inner side of each runway and another pair of the outer side of each runway. Further, the four brackets 179 are in substantial alignment transversely of the runways, as are the brackets 180. Also, it should be noted that each runway has an inner ear roller 181 and an outer roller 182 mounted individually in pairs of the brackets 179 and 180. In addition, at its forward end each runway has an inner roller 183 and an outer roller 184. As will be explained presently, the inner rear rollers 181 have one type of mounting, the inner front rollers 183 have another type of mounting, and the four outer rollers 182 and 184 have a third type of mounting.

The mounting of the inner rear rollers 181 is particularly shown in FIG. 9 wherein it will be seen that a shaft 185 is disposed in aligned openings 186 and 187 in the mounting brackets 179 and 180, respectively, the brackets being welded to the underside of the runway wheel plate 151 and to the side surface of the runway channel 149. The shaft 185 includes an intermediate cylindrical portion 185a and threaded end portions 185b, the ends 185b being diametrically smaller than, and endwardly eccentrically extended from, their intermediate portion 185a. Each of said end portions projects through one of the aligned holes 186 and 187 of the brackets, the holes 186 and 187 being slightly larger in diameter than the cylindrical portion 185a of the shaft. Collars 189 concentrically circumscribe the end portions of the shaft and are received in the holes of the roller brackets. These collars are of a thickness slightly less than that of the roller brackets within which they are received. Washers 190 are fitted over the end portions of the shaft and positioned against the brackets, and nuts 191 are threaded on said end portions for tightening against the washers. In this manner the rear, inner roller brackets are clamped tightly between the intermediate portion of the shaft and the washers to preclude rotation of the shaft. It is also to be noted that the collars mount the intermediate portion of the shaft eccentrically of the holes 186 and 187. When the nuts are loosened, the shaft may be rotated so as to move the surface of the intermediate portion of the shaft toward and away from its respective runway. Referring to FIG. 2, it will be evident that each runway is supported on four rollers, one of which is an eccentrically mounted roller 181. If the runway is not resting solidly on all four rollers, the eccentric shaft of roller 181 is rotated until the solid engagement of all four rollers is attained. Thus, the eccentric roller provides means for eliminating a possible unstable engagement of the runway on the rollers. When the desired adjustment of the eccentric roller 181 is completed, the nuts 191 are tightened to lock the eccentric shaft.

The mounting of the front inner rollers 183 is shown in FIG. 10. A shaft 195, which has opposite ends 196 and 197, extends through the aligned holes 175 of the corresponding front angle brackets 170. The rear end of shaft 195 has a transverse keyway 198 opening radially outwardly of the shaft. A key 199 is bolted to the adjacent bracket 170 and is extended into the keyway so as to preclude both axial and rotational movement of the shaft 195 relative to its bracket.

The front inner roller 183 (FIG. 10) has opposite ends 215, an outer concave or hyperboloidal surface 216 of revolution concentrically circumscribing an axis for the roller and rollably engaging the adjacent front rail 35, an inner cylindrical surface 217 concentric to said axis and circumscribing a bore 218 receiving the shaft 195 therein, and annular end grooves 219 radially outwardly extended in the internal surface adjacent to the opposite ends of the roller. The surface of revolution of the roller has a radius of curvature which is slightly greater than the radius of curvature of the convex surface 36 of its support rail 35 so that the roller is substantially complementary to, and self-centering on, said rail.

An outer tubular two-piece race 225, preferably a thin-walled, hard steel sleeve, is press-fit in the bore 218. Inner washers 226 are fitted against opposite ends of the race within the bore, and retaining rings 227 are respectively received in the end grooves 219 for maintaining the race in axially fixed position within the roller. A tubular retaining cage 229 is fitted in the bore in circumscribing relation to the roller shaft 185. The cage is concentric to the shaft and is in inwardly circumferentially spaced relation to the race 225. The cage has opposite ends 230 adjacent to the opposite ends 215 of the roller. The ends of the cage have annular grooves 231 therein, and a plurality of circumferentially spaced, radially outwardly divergent, frusto-conical ball-receiving pockets 232 are formed in the cage. Outer retaining rings 233 are fitted in the grooves 231 in the opposite ends of the cage in opposed relation to the inner washers 226 at their respective ends of the roller. Spherical balls 235 are individually fitted in the pockets 232 for rollable contact with the race 225 and with the shaft 195.

Referring again to FIG. 9, it is to be understood that each rear inner roller 181 is rotatably mounted on the same type of ball bearing assembly as described in connection with the front inner rollers 183.

The rollers 181 and 183 are mounted, therefore, on their respective shafts 185 and 195 for rotation about their shaft axes and for movement axially of their associated shafts. Such axial movement, however, is limited by engagement of the opposed inner washers 226 and outer retaining rings 233. It is to be noted that the brackets 170 are spaced from the opposed ends 215 of their respective rollers by amounts sufficient to accommodate such axial movement of the rollers on the shafts.

The mounting of the two outer rear rollers 182 and the two outer front rollers 184 is illustrated in FIG. 6 wherein one of the front rollers 184 is shown. Each front roller 184 is mounted on a shaft 235 having end portions extending through the aligned holes 176 of the brackets 170, and each rear outer roller 182 is mounted on a shaft 236 (FIG. 4) extending through aligned openings in the plate brackets 179 and 180. All rollers 182 and 184 are mounted for rotation and limited axial movement in bearing assemblies in exactly the same manner as shown in FIG. 10 in connection with roller 183. The mounting of the outer rollers 182 and 184 differs from the mounting of the outer rollers in that a clamping mechanism is provided on the end of the shafts on which the rollers 182 and 184 are journalled so that these rollers can be locked on their respective rails 35 and 65 at certain stages in the wheel aligning operation.

Each clamping mechanism includes a rigid strap 240 (FIG. 6) that is bolted to one of the brackets 170 and has an upper end 240a disposed in a transverse keyway 241 provided in one end of shaft 235. A U-shaped stirrup 246 underlies the rail 35 and has one end 246a adjustably secured to the lower end of the strap 240 by a bolt 247 which extends through a slot 248 (FIG. 5) in the bar 240 and through a hole in the stirrup end 246a. The other end 246b (FIG. 6) of the stirrup is adjustably secured to the lower end of a second rigid strap 250 by means of a bolt 251 which extends through an appropriate slot in strap 250 and a hole in the stirrup end 246b. The upper end of strap 250 is provided with a cylindrical opening 250a which receives the hub 251 of a handle 252. The hub 251 has an eccentric opening 251a (FIG. 6A) which receives the end of shaft 235, a retainer ring 254 (FIG. 6) being disposed in a groove 255 in shaft 235 to retain the handle on the shaft 235.

Figure 6A:
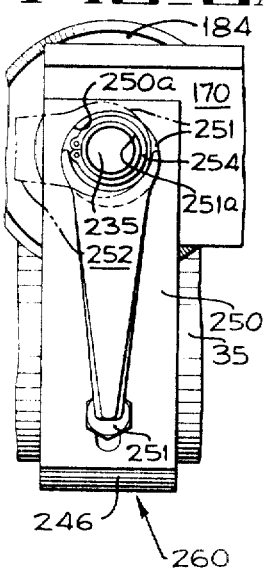
FIG. 6A is a side elevation of the clamp mechanism of FIG. 6 but with the clamp handle rotated ninety degrees from its position in FIG. 6.
Figure 6:
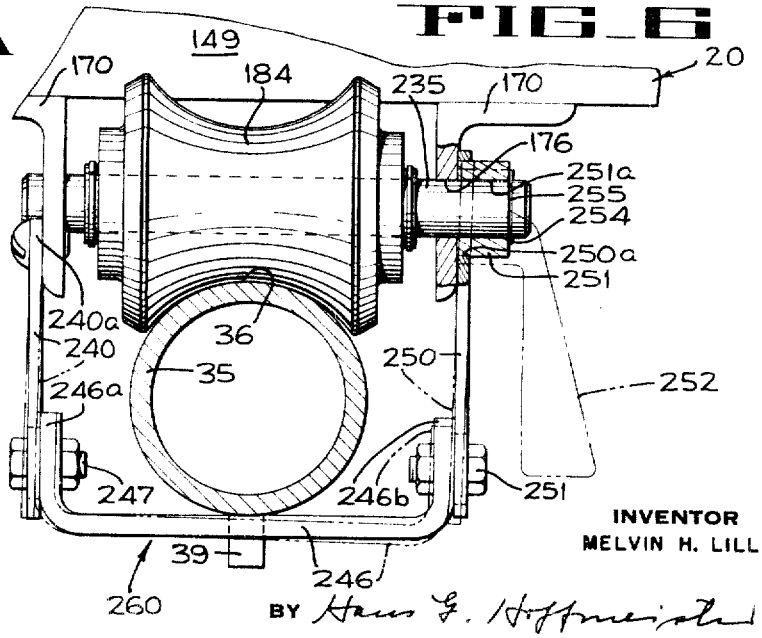
FIG. 6 is a still further enlarged, fragmentary transverse section taken on line 6—6 in FIG. 5 with an alternate position of a clamp mechanism illustrated therein being shown in dashed lines.

It will be evident that when the handle 252 is swung from the full line position to the phantom line position in FIG. 6A, the strap 250 will be moved upwardly causing the stirrup 246 to engage the rail 35, thereby clamping the roller 184 to the rail 35. It is thus evident that when the handles are in their downwardly extending unlocked positions, the runways 20 are free to move on the rails, whereas with the handles in clamping positions, the runways are precluded from such movement. The stirrups 246, the straps 240 and 250, and the handles 252 constitute clamps, generally indicated by the numeral 260. It is to be noted that the stirrups 246 (one only being shown in FIG. 5) associated with the front outer rollers are located between the stop blocks 39 and the outer triangular bracket 26 so that transverse movement of the runways on the rails is limited. Similarly, the stirrups associated with the rear outer rollers 182 are disposed between the lift arm 56 and the adjacent stop block 67.

As is now evident, the front rollers 183 and 184 of each runway rest in rolling engagement on the subjacent front support rails 35. The rear rollers 181 and 182 are likewise supported on the rear support rail 65. The runways are thus mounted for movement transversely of each other along the support rails. Also, the runways are mounted for simultaneous elevational movement between level positions (FIG. 3) when the lift rams 75 are expanded, and inclined positions (FIG. 4) when the rams are contacted. In the inclined positions, the rear end portions 148 of the runways are at a lower elevation than the front end portions 147. The runways are thus raised and lowered incident to the raising and lowering of the rear rail 65. It is significant that the rollers accommodate elevational movement of the rear rail 65 inasmuch as the concave surfaces of the rollers slide circumferentially on the convex surfaces 36 and 68 of their respective rails during said elevational movement of the rear rail.

It is also to be noted that strike plates 237 preferably are mounted on the floor 28 below the rear end portions 148. The rear end portions engage the strike plates in the inclined positions of the runways.

Figure 3:
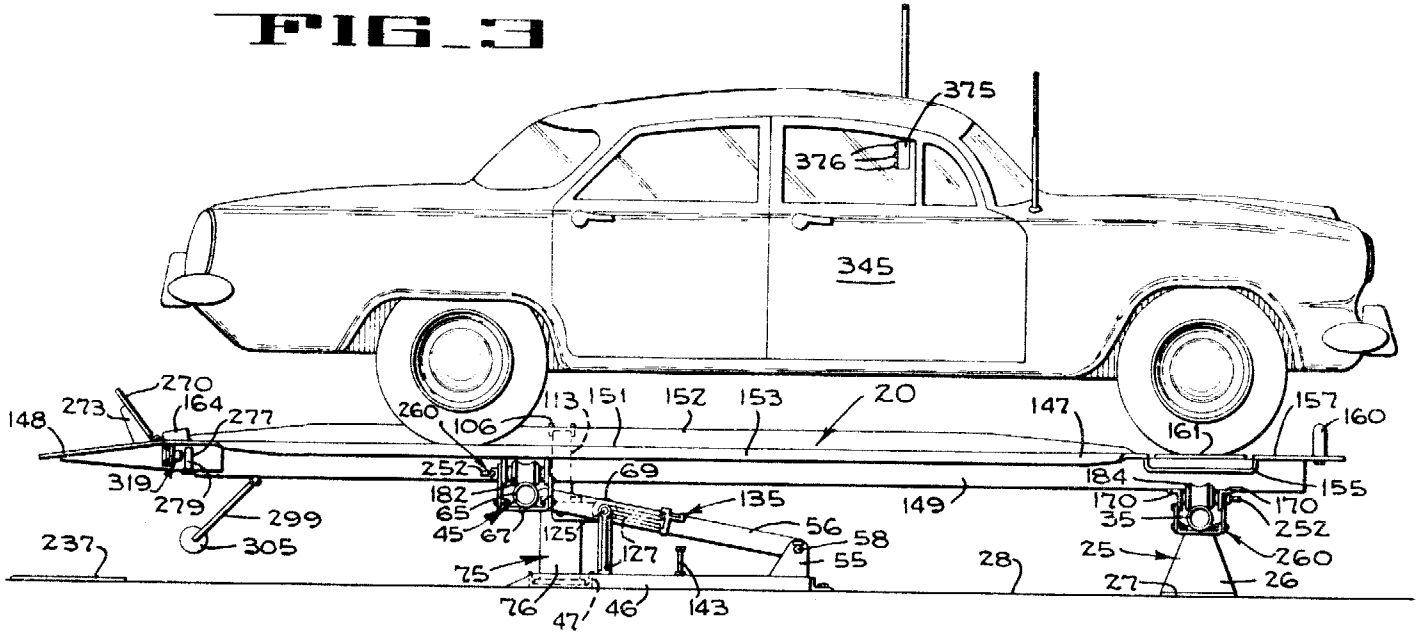
FIG. 3 is a side elevation of the vehicle supporting rack in a level position with a vehicle supported thereon.

In addition, because of the limited axial movement of the rollers 181, 182, 183 and 184 on their respective shafts 185, 236, 195 and 235 when the runways 20 are in elevated level positions, the front and rear end portions 147 and 148 of the runways are transversely adjustable relative to each other. This adjustment is limited by the allowable free play of the rollers. Further, said axial free play is precluded or taken up when the runways are lowered to inclined positions. Such take-up of the free play occurs because the front and rear rollers are respectively moved toward and away from each other upon raising and lowering of the rear rail. This is illustrated in FIGS. 3 and 4. There is relative movement between the front and rear rollers on each runway because the rear rail 68 moves in an arc about the lift arm pivot pins 58. This arc is different from the arc of movement of the rear rollers which swing on an arc that has the rail 35 as center. For example, when the runways are lowered, the rear rail 68 is moved downwardly and rearwardly relative to the front rails 35 whereby the rear rollers are slid axially toward the lower ends of their shafts. At the same time, the front rollers are slid axially on their shafts. When the runways are raised, the front and rear rollers are moved toward each other so that the ends of all of the rollers are spaced from their brackets 170 or 179–180.

Figure 12:
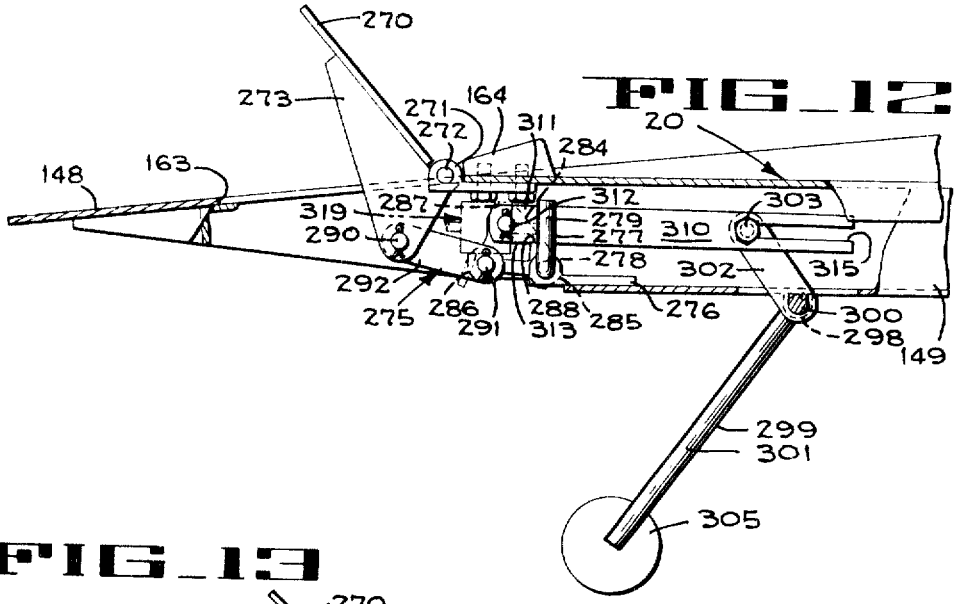
FIG. 12 is a fragmentary side elevation of the runway as shown in FIG. 11 but with portions broken away and in section and showing the runway in a level position.
Figure 13:
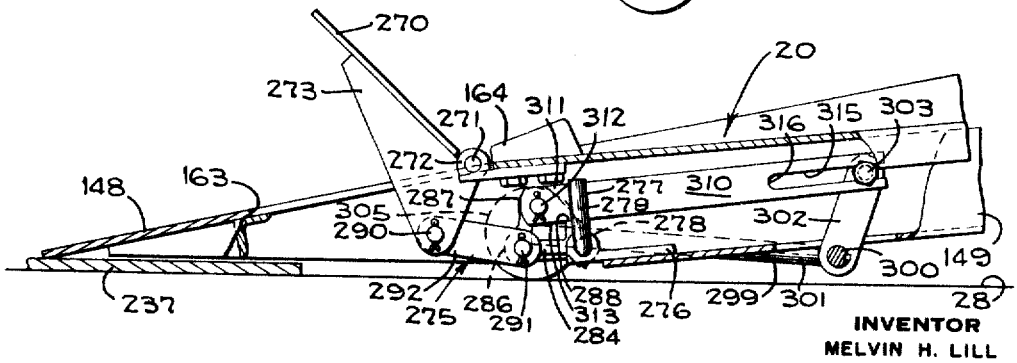
FIG. 13 is a view similar to FIG. 12 but showing the runway in an inclined position and the guard in a raised position.

The subject rack also includes runway guards 270 (FIGS. 11, 12, 13 and 14) which are raised to the upwardly inclined position of FIG. 13 to prevent the automobile from rolling off the runways 20. For mounting the guards, guard hinges 271 are individually rigidly bolted to the wheel plates 151 in forwardly adjacent relation to the openings 163. Each guard is pivotally connected to a hinge 271 for elevational movement about a pivot pin 272 extended transversely of the runways. Each guard is thus movable between a lowered position (FIG. 14), wherein it is disposed in the opening 163, to the upwardly extended position of FIG. 12. A pair of spaced webs 273 are welded to and extend downwardly from each guard through the adjacent opening.

An identical over-center, toggle linkage 275 is provided in each runway 20. Each linkage includes a pair of transversely spaced pivot brackets 276 (FIG. 11) mounted on the central portion of the channel member 149 at a point below and, forwardly of the guard hinges 271. An L-shaped guard-retracting crank 277 includes an axle 278, constituting a first axis of the toggle linkage, rotatably journaled in the pivot brackets. It is noted that the axle is extended transversely of the runway and is parallel to the guard pivot pin 272. The retracting crank also has a handle 279 perpendicularly extended from the axle externally of the channel member.

Each toggle linkage 275 also includes a triangular link 284 having a lower front apex 285 rigidly secured to the axle 278 between the pivot brackets 276, a lower rear tubular apex 286, an upper apex 287, and a lateral shoulder 288 intermediate the upper and lower front apices. A guard pin 290, constituting a second toggle axis, is extended between and mounted on the webs 273 in downwardly and rearwardly spaced relation to the guard pivot pin 272. A toggle pin 291, constituting a third toggle axis, is journaled in the lower tubular apex 286 of the triangular link and is also parallel to the guard pivot pin 272 although located between the crank axle 278 and the guard pin 290. Toggle arms 292 pivotally interconnect corresponding opposite ends of the guard pin 290 and toggle pin 291, and a tubular spacer 293 (FIG. 11) circumscribes the guard pin between the toggle arms. The triangular link is pivotal with the crank axle between a guard locking position (FIGS. 12 and 13) wherein the guard 270 is pivoted into its guarding position and wherein said third axis, or toggle pin 291, is located below the common plane of the first axis, or crank axle 278, and the second axis, or guard pin 290, and an unlocking position (FIG. 14) with the guard released for movement into its retracted position and with the said third axis located above the said common plane of said first and second axes. The retracting crank is capable of moving the triangular link between its locking and unlocking positions but is primarily employed to move the link into unlocking position, as will be subsequently evident.

A mounting sleeve 298 (FIG. 11) is supported on the channel member 149 of each runway 20. A guard raising lever 299 includes an arm 301 and a horizontal shaft 300 journaled in the sleeve 298. The arm 301 of lever 299 projects radially downwardly from the shaft 300 while the horizontal shaft portion 300 is keyed to an upper arm 302 that projects radially upwardly into the channel member in an obtuse angular relation with the arm 301. A slide member, in the form of a capscrew 303, has one end threaded into a tapped hole in the arm 302 in upwardly spaced, parallel relation to the shaft 300. A cylindrical counterweight 305 is journaled on the arm 301 for rotation about an axis in downwardly spaced, parallel relation to the shaft 300.

Each toggle linkage 275 also includes an elongated actuating lever 310 which has a rear end 311 pivotally connected to the upper apex 287 of the corresponding triangular link 284 by an upper pin 312. The upper pin is parallel to the guard axis and constitutes a fourth axis of the toggle linkage. The lever has a lower edge 313 engageable with the shoulder 288 of the link 284. The lever extends forwardly within the channel member 149 and provides an elongated, longitudinally extended slot 315 terminating in a rear edge 316. The capscrew slide member 303 is slidably received in the slot of lever 310, and the head of the member 303 limits movement of the arm transversely away from the lever but permits said longitudinal slidable movement of the member within the slot.

When each link 284 is in its guard-locking positions (FIGS. 12 and 13), the lower edge 313 of the lever 310 abuts the corresponding shoulder 288 thereby to limit counterclockwise rotation of the link, as viewed in FIG. 13. The guard 270 is precluded from retracting when the link is in its guard locking position since downward pressure on the guard is ineffective to rotate the link in a counterclockwise direction; that is, such counterclockwise rotation is precluded by abutment of the shoulder 288 with the lever 310. In addition, downward pressure on the guard is ineffective to rotate the link in a clockwise direction because said third axis 291 of the linkage is below the plane of said first and second axes 278 and 290.

The described linkage 275 and the lever 299 provide a unique coaction between each runway 20 and its guard 270. When the runway is elevated from an inclined position, the linkage and the lever 299 automatically raise the guard. When the runway is lowered into inclined position, the guard remains in raised position; the linkage and the bell crank do not thereby automatically retract the guard.

Figure 14:
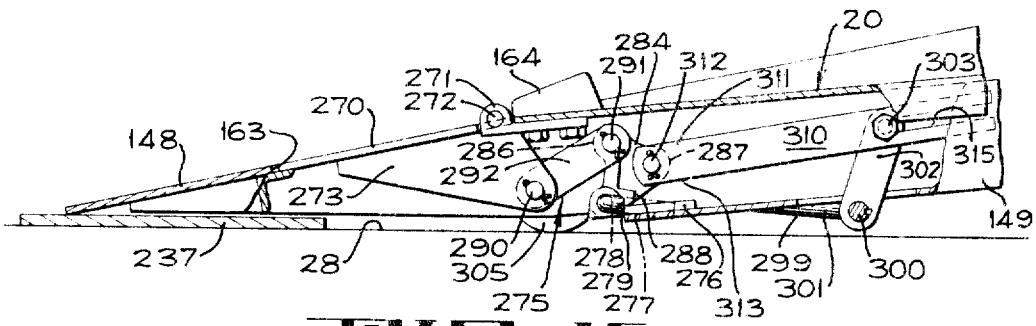
FIG. 14 is a view similar to FIG. 13 but showing the guard in a retracted position.

More specifically, the coaction between each runway 20 and its guard 270 is best understood by reference to FIG. 14 where the runway is illustrated in an inclined position and the guard is illustrated in a retracted position. If the runway is elevated, the counterweight 305, acting through lever 299, causes the slide member 303 to bear against the rear edge 316, urging the lever 310 rearwardly or to the left in FIG. 14. This movement of lever 310 pivots the triangular link 284 in a counterclockwise direction about axle 278 and shoves rearwardly on the toggle links 292. Further, the toggle links pivot the guard 270 in a clockwise direction about pivot pin 272. When the runway is in its level position (FIG. 12), the toggle linkage 275 and the lever 299 have moved the guard into its fully raised position.

When the runway 20 is lowered from its level position (FIG. 12) into an inclined position, as illustrated in FIG. 13, the weight 305 moves into contact with the floor 28. The arm 302 is pivoted in a clockwise direction to move the slide member 303 forwardly in the slot 315. Thus, each triangular link is not pivoted in a clockwise direction when its runway is lowered; instead said triangular link is merely conditioned for such clockwise movement by subsequent rotation of its axle 278 when the handle 279 is turned. The slot 315 in the lever 310 is longer than the stroke of the slide 303 so that the slide cannot slip out of the slot even if the counterweight 305 moves into engagement with the associated runway.

Figure 11:
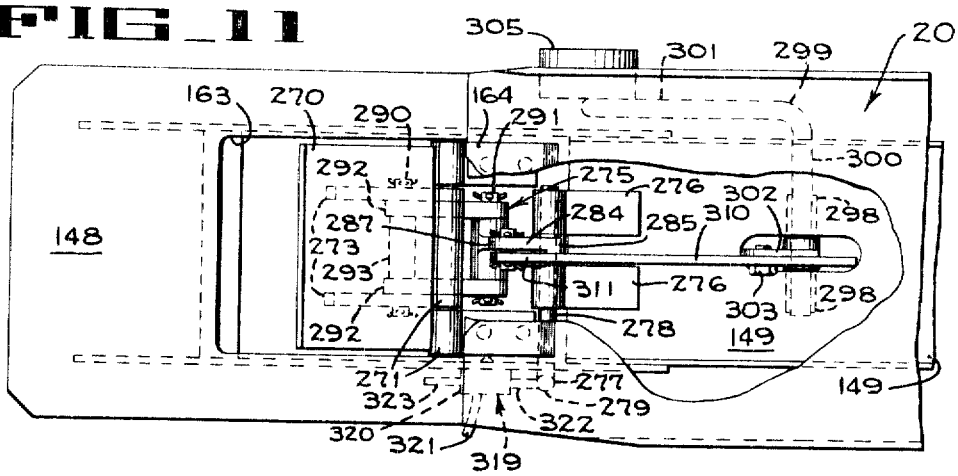
FIG. 11 is an enlarged, fragmentary plan of a rear portion of a runway of the subject rack with a portion of the runway being broken away and with the runway guard in a raised position.
Figure 16:
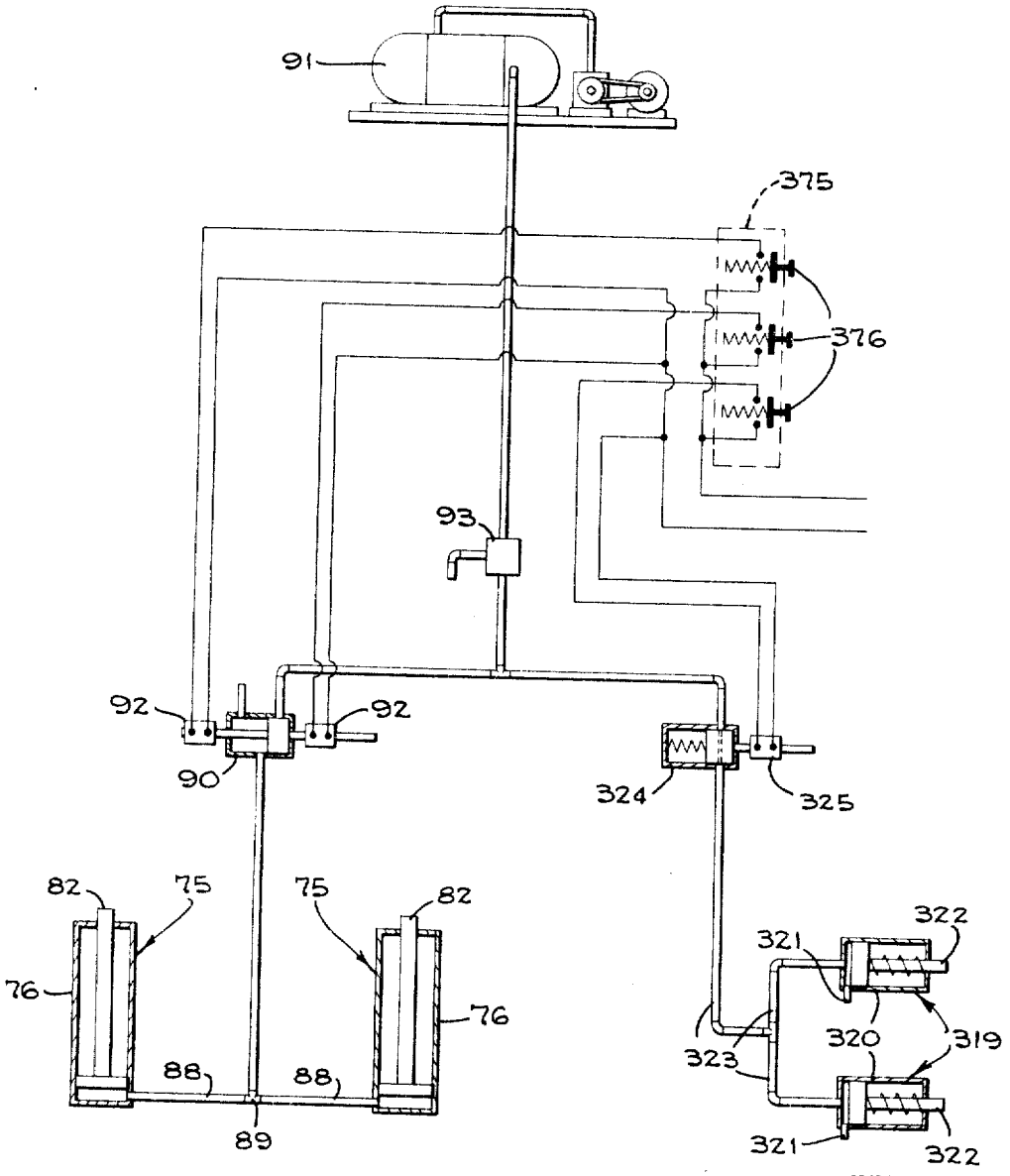
FIG. 16 is a schematic of an electro-pneumatic circuit employed with the rack of the present invention.

The handles 279 are turned either manually or by guard retracting rams 319 (FIGS. 11 and 16). These rams include cylinders 320 (FIG. 11) individually mounted rearwardly of the handles on the runways 20. The cylinders are provided with bleeding ports 321 (FIG. 16) of predetermined size, and piston rods 322 are reciprocally mounted in the cylinders in substantially normal relation to their respective handles 279. Hoses 323 are connected to the cylinders and have opposite ends connected to a control valve 324 which, in turn, is connected to the source 91 of fluid pressure through the main valve 93. Air is continuously delivered to the cylinders 320 at a predetermined slow rate and is bled from the ports in order to prevent accumulation of moisture in the cylinders 320 but without actuating the piston rods 322. If it is desired to actuate the guard retracting rams to rotate their respecive handles, air is fed to the cylinders 320 at a rate more rapidly than air is exhausted from the ports so that the rods are extended. This is accomplished by energizing a solenoid 325 connected to the guard control valve. When the air pressure is relieved, the ports bleed the air from the cylinders and allow the rods to retract.

With reference to FIGS. 13 and 14, if the guard 270 is in a raised position, it is retracted by rotating the handle 277 in a clockwise direction. If the handle is rotated mechanically, the solenoid 325 need only be energized momentarily. Such momentary energization extends the piston rods 322 and effects the desired rotation of the handles. Furthermore, the handles remain in the positions illustrated in FIG. 14 and the guard remains in a retracted position. This is true even though the solenoid 325 is de-energized and the piston rods 322 are retracted. On the other hand, if sufficient force, either manual or mechanical, is applied to the handles to turn the same when the runways are in level position (FIG. 12), thereby retracting the guards, the guards are automatically returned to raised positions as soon as such pressure is relieved from the handles. This is believed understood since the levers 299 and associated weights 305 constantly urge the guards to raised positions when the runways are elevated in their lever positions.

Jack-supporting stands 326 are individually mounted on the inner ends 171 of the front angle brackets 170 (FIGS. 1, 2 and 15). Each stand includes a plate 327 (FIG. 15) which spans the two brackets and a retainer member 328 that is secured to the plate and has a lip 328a in downwardly spaced relation to the plate. The lip is extended under the rearwardmost bracket 170 for limiting upward movement of the plate. Each stand also has a front cleat 329 forwardly adjacent to the forwardmost front bracket, a central rib 330 downwardly extended from the plate in a plane substantially bissecting the front support rails 35, and rear and front flanges 331 and 332 upwardly extended from the plate. Each stand is thus fitted on its brackets for adjustment thereon transversely of its respective runway 20. The stand is removed from the brackets by pivoting the plate 327 upwardly relative to the rearwardmost front bracket 170 and then sliding the plates rearwardly to remove the retaining lip 328a from underneath the rearwardmost front bracket 170.

Lifting jacks 340 (FIG. 1) are individually mounted on the stands 326 for imparting lifting force to a vehicle, as 345 (FIG. 3), supported on the runways 20. The flanges 331 and 332 of the stands prevent the jacks from sliding rearwardly off from the stands when runways 20 are lowered. If an extra heavy vehicle is raised with the jacks, the jack stands may deflect but only until their respective ribs 330 engage the front support rails 35 therebeneath. Also, if the jacks are located forwardly on the stands during lifting of a vehicle, the plates are precluded from tipping forwardly off from the brackets by engagement of the lips 328a with their respective brackets.

A switch box 375 (FIGS. 3 and 16) is supported, in a manner not shown, at a position above the vehicle 345 and is suspended adjacent to the driver's window of the vehicle. The switch box contains switches 376 for controlling the solenoids 92 and 325 associated with the lift rams 75 and the guard rams 319, respectively.

In briefly summarizing its use, the rack of the subject invention is conveniently employed in association with wheel alignment apparatus (FIG. 1) including an upstanding screen 350 supported on the floor 28 forwardly of the rack and a pair of optical units 351 mounted on the floor in laterally outwardly adjacent relation to the front end portions 147 of the runways 20. Such alignment apparatus is more fully described in the above identified Carrigan Patent No. 2,601,262.

Before a vehicle 345 is driven onto the subject rack, it is assumed that the runways 20 are in their inclined positions (FIG. 4), that the guards 270 are in their retracted positions (FIGS. 4 and 14), and that the safety legs 127 are conditioned for movement into supporting positions, it being noted in FIG. 4 that the stud 143 holds the latch 135 in an unlatched position.

The clamps 260 are released so that the runways 20 can be adjusted laterally on the support rails 35 and 65. The rear inner roller shafts 185 are rotated, if necessary, so that all of the rollers 181, 182, 183 and 184 are all in load-bearing engagement with their rails. The runways are then moved toward or way from each other to correspond to the distance between transversely aligned wheels, that is the tread width, of the vehicle 345. The vehicle is driven upwardly onto the runways until the front wheels rest on the turntables 161.

With the vehicle 345 on the runways 20, the lift rams 75 are expanded. Expansion of the rams raises the runways to level positions perpendicular to the screen 350 (FIGS. 1 and 3). Elevation of the runways causes the lower arm 301 of levers 299 to pivot downwardly, that is in a counterclockwise direction as viewed in FIG. 14, so that the guards 270 are raised into their guarding positions through the toggle linkages 275. Also, the safety legs 127 simultaneously swing downwardly by gravity, during elevation of the runways, so that their base abutment ends 129 rest on, or are closely upwardly adjacent to, the longitudinal base portions 46 when the runways are in said level positions. In this manner the legs preclude inadvertent descent ofthe runways if there is failure of the rams. The latch 135 is moved into its latching position by the spring 141 as soon as the releasing arm 139 moves out of engagement with the stud 143. Whereas longitudinal free play of the runways relative to the rails 35 and 65 is precluded in the inclined positions of the runways, thereby to steady the runways as a vehicle is driven thereon, the runways are automatically freed for limited free play when the runways are elevated.

Two transverse adjustments of the runways 20 may be required to properly position the vehicle 345 for making wheel alignment checks with the alignment apparatus 350 and 351. These include adjustment of the entire vehicle to the left or to the right in order to bring the longitudinal center line of the vehicles into coincident relation with the longitudinal center line of the alignment apparatus, the latter being determined by the floor positions of the pedestals 25 or by the screen but not by the longitudinal center line of the runways 20. Therefore, the vehicle is manually pushed to the left or to the right, as required, this movement being easily accomplished because the runways are mounted for simultaneous movement in the same direction on the support rails 35 and 65 by the rollers 181–184. It is to be noted that even if the rear support rail is not precisely parallel to the front rails, the rollers shift axially on their respective shafts 185, 195, 235 and 236 to accommodate any such non-parallelism and to assure unrestricted lateral adjustment of the runways without binding of the rollers.

Another transverse adjustment may be required with vehicles having swing-type axles, not shown, so that the positions of the rear wheels of the vehicle on the runways 20 simulate their normal road positions. Usually a few vertical bounces of the rear end portion of the vehicle on the runways are sufficient to allow the rear wheels to assume such normal positions. Of course, because of the free play of the rollers 181–184 relative to the runways, the rear end portions 148 of the runways are permitted to shift laterally relative to their front end portions 147 thereby to permit limited adjustment of the rear wheels of the vehicle into said normal positions. After the vehicle has been properly positioned in such manner, the runways are locked against transverse and longitudinal movement by locking the clamps 260.

After the wheel alignment checks have been made, or other work on the vehicle 345 has been completed, the safety legs 127 are manually pivoted into engagement with the latches 135 (dashed lines in FIG. 3) whereupon the legs are held in retracted position. It may be necessary to elevate the lift rams 75 slightly in order to move the legs out of engagement with the base portions 46. The lift rams are then retracted to lower the runways 20 into their inclined positions (FIG. 13). Although the arms 301 of the guard raising levers 299 are rotated in a clockwise direction, as viewed in FIG. 12, during such lowering of the runways, the guards 270 are not automatically retracted, as previously explained. In this manner, inadvertent rolling of the vehicle from the runways during lowering thereof is precluded. It is noted that free movement of the slide member 303 forwardly through their slots 315 assures unrestricted lowering of the runways. For example, any jamming of the toggle linkages 275 in pivoting from locked to unlocking positions does not interfere with lowering of the runways. Since positive connections are not provided between the levers 299 and their associated linkages, imposition of the weight of the vehicle on the arms 301 is avoided while the lift rams 75 retract. In order to retract the guards, it is necessary to move the toggle linkages into unlocking position, either manually or mechanically by actuation of the guard retracting rams 319. It is noted that the stud 143 engages the releasing arm 139 and moves the latch 135 to its unlatched position whereby the safety legs 127 are conditioned for movement into runway supporting position upon subsequent elevation of the runways. The vehicle is then backed downwardly off the runways whereby the rack is ready for subsequent use.

From the foregoing, it is evident that the subject vehicle supporting rack has many unique features. Mounting the runways 20 for elevational movement between level and inclined positions as well as for adjustment transversely of each other shortens the overall length of the rack and obviates the need for long ramps leading upwardly onto the runways. An adjustable, shortened rack is thus provided without the expense and inconvenience of a pit installation. By mounting the rails 35 and 65 in level positions, by minimizing elastic deformation of the elevating rails 65, and by adjusting the runways into a plane parallel to the rails, the runways can be elevated into precisely level positions. A vehicle can be located quickly and accurately in a predetermined position for making wheel alignment checks, or for performing other tasks. In contrast with racks requiring a pit, the subject rack is portable in that it is readily attached to or detached from a foundation. In addition, the rack provides for safe and dependable support of the runways in elevated position and of a vehicle thereon; in this regard the safety legs 127 and the guards 270 must be individually retracted independently of the elevational movement of the runways.

While a preferred embodiment of the present invention has been shown and described, it will be understood that various changes and modifications may be made in the details thereof without departing from the spirit and the scope of the appended claims.

Having thus described the invention what I claim as new and desire to protect by Letters Patent is:

1. In combination, mounting means, elongated, substantially horizontal, front and rear rails borne by said mounting means in opposed, transversely spaced, substantially parallel relation to each other, an elongated vehicle support having opposite end portions adjacent to said rails, rollers individually rollably engaging said rails for rolling movement therealong and being connected to said support for rotation relative to said support about axes extended transversely of said rails, said rails and rollers having substantially complementarily engaging convex and concave surfaces, elevational adjustment of one of the end portions of said support relative to its opposite end portion being accommodated by the engaging convex and concave surfaces adjacent to said one end portion, and powered means for effecting said elevational adjustment.

2. In an adjustable vehicle supporting rack, a pair of support rails having upper convex surfaces concentric to longitudinal axes for their respective rails, means supporting said rails in axially spaced substantially parallel relation to each other and in substantially horizontal positions, a runway extended transversely of said rails, rollers having concave surfaces of revolution concentrically circumscribing individual axes for the rollers and rollably engaging the convex surfaces of said rails, and means journaling said rollers on said runway for rotation about their individual axes thereby mounting said runway on said rails for movement thereon in a direction extending transversely of said runway, the supporting means that supports one of said rails including powered means for raising and lowering said one rail with respect to the other rail, said convex surface of said one rail and its engaging concave surface accommodating relative circumferential movement therebetween during said raising and lowering.

3. An adjustable rack for supporting a wheeled vehicle comprising front mounting means, substantially horizontal front rail means borne by said front mounting means and having upper convex portions concentric to a longitudinal axis for said front rail means, rear rail means having upper convex portions concentric to a longitudinal axis for said rear rail means, means mounting said rear rail means in axially spaced, substantially parallel relation to said front rail means and for elevational movement relative to said front rail means, a pair of elongated runways individually adapted to receive the wheels of a vehicle, said runways having opposite front and rear end portions and being extended transversely of said axes of said rail means with said front and rear end portions respectively over the axes of said front and rear rail means, and front and rear rollers individually rotatably supported on said front and rear end portions of each runway for rotation about axes disposed transversely of said axes of said rail means and having concave surfaces of revolution substantially complementarily rollably engaging the convex portions of said front and rear rail means.

4. In an adjustable vehicle supporting rack, a front mounting member, a rear base, a rear mounting member supported on said base in spaced relation to said front mounting member and for elevational adjustable movement, elongated front and rear support rails individually borne by said mounting members and having upwardly disposed convex surfaces concentric to longitudinal axes for their respective rails, the axes of said front and rear rails being in spaced, substantially parallel relation to each other, an elongated runway extended transversely over said rails, rollers journaled on said runway for rotation about axes extended transversely of the axes of said rails and having concave surfaces individually substantially complementarily receiving said convex surfaces of the rails whereby said runway is supported on said rails for lateral movement when said rollers roll along their respective rails and whereby the rollers on said rear rail accommodate elevational movement of said rear end portion of said runway relative to said front end portion thereof upon elevational adjustment of said rear mounting member, and a lift mechanism engaging said rear mounting member for raising and lowering the rear end portion of said runway.

5. In a vehicle supporting rack, an enlongated support rail mounted in a substantially horizontal position, an elongated runway extended transversely over said rail, an elongated shaft, means mounting said shaft longitudinally on said runway, a roller rotatably mounted on said shaft and in rolling engagement with said rail for movement of said runway transversely of itself along said rail, a stirrup extended transversely under said rail, a keeper rigidly interconnecting said stirrup and said shaft mounting means on one side of said rail, a hanger on the opposite side of said rail from said keeper having a lower end connected to said stirrup and an upper aperture receiving said shaft therein, and an annular cam fitted in said aperture in rotatable circumscribing relation to said shaft, said cam having a peripheral surface eccentric to said shaft and rotatably engaging said hanger whereby rotation of said cam moves said stirrup between a runway locking position engaging said rail and clamping the same between said roller and said stirrup and a runway releasing position retracted from said clamping position.

6. A vehicle supporting rack comprising a pair of elongated support rails, each rail having an upper convex surface concentric to its longitudinal axis, means supporting said rails in axially spaced, substantially parallel relation to each other and in substantially horizontal positions, means mounting one of said rails for elevational movement relative to the other, an elongated runway extended transversely over said support rails, a plurality of shafts, means mounting said shafts on said runway over said support rails and in substantially parallel relation to said runway, and rollers engaging said rails and being journaled on said shafts for rotation therearound and for movement axially thereof, said elevationally movable rail being movable toward and away from the other rail by said supporting means during elevational movement thereby to slide said rollers axially on their shafts, and said shaft mounting means including stops limiting said axial movement of said rollers on said shafts.

7. The combination of an elongated runway having opposite front and rear end portions, means pivotally supporting said front end portion of said runway for movement about a substantially horizontal front axis extended transversely of said runway, a rear rail having a convex upper surface and being extended transversely under said rear end portion of the runway in spaced substantially parallel relation to said front axis, a roller having a concave surface of revolution rollably engaging the upper surface of said rail, said roller being journaled on said runway and movable longitudinally of said runway, and means mounting said rail for elevational movement along an arc having a radius of curvature less than the radius of the curvature of the arc of movement of said roller about said front axis as said runway is raised and lowered on said rail whereby said roller is moved longitudinally of said runway incident to said elevational movement thereof.

8. In a vehicle lifting apparatus, an elongated runway having front and rear end portions, means pivotally supporting said front end portion of said runway in an elevated position for pivotal movement of said runway about a front axis disposed transversely of said runway and for limited free play of said runway longitudinally thereof, a rear support rail having a longitudinal axis and extended transversely under said rear end portion of said runway in substantially parallel relation to said front axis and having an upper convex surface concentric to the longitudinal axis of said rail, a roller having a concave surface of revolution concentric to the axis of said roller and substantially complementarily rollably rested on the convex surface of said rail, means rotatably mounting said roller on said runway with said roller axis extended longitudinally of said runway and for limited axial free play of said roller relative to said runway, said roller mounting means including stops engageable with said roller upon axial movement of said roller for limiting said free play thereof, and means pivotally mounting said rail for elevational adjustable movement in an arc concentric to an axis between and substantially parallel to said front axis and to the rail axis whereby said roller is moved axially of itself into and out of engagement with said stops upon elevational movement of said rail.

9. In a vehicle lifting apparatus, an elongated runway having front and rear end portions; means pivotally supporting said front end portion of said runway in an elevated position for pivotal movement of said runway about a front axis disposed transversely of said runway and for limited free play of said runway longitudinally thereof; a rear support rail extended transversely under said rear end portion of said runway in substantially parallel relation to said front axis and having an upper convex surface concentric to the longitudinal axis of said rail; bracket members rigidly connected to said runway and downwardly extended therefrom in longitudinally spaced relation to each other; a shaft secured in said bracket members against movement relative thereto; a roller having a convace surface of revolution concentric to the axis of said roller and substantially complementarily rollably rested on the convex surface of said rail, an internal wall circumscribing said shaft, and opposite ends in adjacent spaced relation to said bracket members, the concave surface of said roller having a radius of curvature greater than the radius of the convex surface of said rail; ball bearing means positioned between said shaft and the internal wall of said roller and mounting said roller on said shaft for rotation and axial movement relative to said shaft; and means pivotally mounting said rail for elevational adjustable movement in an arc concentric to an axis between and substantially parallel to said front axis and to said rail axis whereby said roller is moved axially of itself upon elevational movement of said rail and until said roller engages one of said bracket members and limits said axial movement.

10. In combination, an annular roller having an axial bore and an internal wall circumscribing said bore, a tubular race fitted in said bore against said wall and having opposite ends, inner stops connected to said opposite ends of the race and extended radially inwardly of said bore, an elongated shaft extended through said bore in circumferentially spaced relation to said race, a tubular cage rotatably circumscribing said shaft within said race providing opposite ends and a plurality of pockets radially extended therethrough, outer stops connected to the opposite ends of said cage in endwardly opposed relation to said inner stops, and a plurality of spherical balls individually fitted in said pockets and rollably engaging said shaft and said race and mounting said roller for rotational and axial movement on said shaft, said axial movement being limited by engagement of opposed stops at opposite ends of said race.

11. A vehicle supporting rack comprising a pair of rails; means supporting said rails in axially spaced substantially parallel relation to each other and in substantially horizontal positions; a runway extended transversely over said rails; front and rear pairs of shafts; rollers individually concentrically mounted on said shafts; and means individually mounting said shafts on said runway extending longitudinally of said runway, each roller being in rollable engagement with one of said rails and being disposed opposite an adjacent roller transversely of said said runway, said shaft mounting means including means for mounting one of said rollers for adjustment to positions selectively spaced from said runway for maintaining simultaneous, complementary engagement of all of said rollers with their respective rails.

12. A vehicle supporting rack comprising a pair of rails; means supporting said rails in axially spaced, substantially parallel relation to each other, and in substantially horizontal positions; and elongated runway extended transversely over said rails; front and rear pairs of shafts; rollers mounted on said shaft means individually mounting said shafts on said runway and said shafts extended longitudinally of said runway and with a pair of rollers rollably engaging each of said rails so that the rollers engaging each rail are opposite to each rail are opposite to each other transversely of said runway, the means mounting one of said shafts including a pair of bracket portions rigidly secured to said runway in longitudinally spaced relation and providing a pair of longitudinally aligned holes, said one shaft including a cylindrical intermediate portion circumscribed by its roller and a pair of end portions endwardly eccentrically extended from said intermediate portion through said holes, collars concentrically circumscribing said end portions and fitted in said holes of said bracket members whereby rotation of said one shaft in said collars adjusts said axis of said intermediate portion toward and away from said runway so that all of said rollers are maintained in contact with their respective rails; and means engaging the end portions of said shaft and being tightenable against said bracket portions for securing said one shaft in selected positions of axial adjustment relative to said runway.

13. An adjustable vehicle lifting apparatus comprising a pair of elongated, vehicle supporting runways having front and rear end portions; means mounting the front end portions of said runways for elevational pivotal movement of said runways about a substantially horizontal front pivot axis extended transversely of said runways and for movement of said runways transversely relative to each other; a base; a pair of lift arms individually substantially coplanar with said runways and in transversely spaced relation to each other, said lift arms having ends mounted on said base for elevational pivotal movement about a substantially common axis parallel to said pivot axis of the runways, and said arms having opposite ends; an elongated, rigid cross member rigidly interconnecting said opposite ends of the arms and extended transversely beneath the rear end portions of said runways in substantially parallel relation to said front axis; means supporting the rear end portions of said runways on said cross member for movement of said runways along said cross member; and lift means mounted on said base and connected to said arms for pivoting said arms about said common axis thereby to raise and to lower said runways whereby load and lift forces imposed transversely on the cross member are imposed closely adjacent to the connections of said cross member to said lift arms so as to minimize elastic deformation of said cross member.

14. An adjustable vehicle lifting apparatus comprising a pair of vehicle supporting runways having front and rear end portions; means mounting the front end portions of said runways for elevational pivotal movement of the runways about a substantially horizontal front pivotal axis extended transversely of said runways and for movement of said runways transversely relative to each other; a base; a pair of lift arms individually substantially coplanar with said runways and in transversely spaced relation to each other, said arms having front ends mounted on said base for elevational pivotal movement about a substantially common axis parallel to the pivot axis of said runways and having opposite rear ends; an elongated, rigid cross member rigidly interconnecting said rear ends of said arms and extended transversely beneath said rear end portions of said runways in parallel relation to said front axis; means supporting the rear portions of said runways on said cross member for movement of said runways along said cross member; an elongated lift bar rigidly interconnecting said lift arms intermediate their front and rear ends and being in substantially parallel relation to said common axis; a lift ram mounted on said base in juxtaposed relation to said lift bar having an upper end portion movable upwardly and downwardly relative to said base; a yoke supported on said upper end portion of said ram having a pair of downwardly extended legs; and links interconnecting said lift bar and said legs of the yoke for raising and lowering said lift bar and said arms upon movement of the upper end portion of said ram toward and away from said base.

15. In an adjustable vehicle lifting apparatus, a pair of elongated, vehicle supporting runways having front and rear end portions; means mounting the front end portions of said runways for elevational pivotal movement of the runways about a substantially horizontal, front pivot axis extended transversely of said runways and for movement of the runways transversely relative to each other; a base; a pair of lift arms individually substantially coplanar with said runways and in transversely spaced relation to each other, said arms having front ends mounted on said base for elevational pivotal movement about a substantially common axis parallel to said axis of said runways, and having opposite rear ends; a rigid cross member rigidly interconnecting the rear ends of said arms and extended transversely beneath said rear end portions of said runways in parallel relation to said front axis; means supporting said rear portions of said runways on said cross member for movement of said runways along said cross member; an elongated tubular lift bar rigidly interconnecting said lift arms intermediate their front and rear ends and substantially parallel to said common axis; an elongated shaft extended through said lift bar having opposite ends rotatably received in said lift arms and outwardly extended therefrom; safety support legs individually rigidly connected to said ends of the shaft and radially extended therefrom in a substantially common plane for movement with said shaft between a retracted position alongside of said arms and a runway supporting position downwardly extended from said arms for engagement with said base; and lift means mounted on said base and connected to said lift bar for pivoting said arms about said common axis thereby to raise and to lower said runways.

16. In a vertical lift rack, a support; an elognated rail; means mounting said rail on said support in a horizontal position and for elevational movement toward and away from said support; powered lift means borne by said support and connected to said rail mounting means for elevationally moving said rail; an elongated wheel runway extended transversely over said rail; roller means releasably rollably engaging said rail, connected to said runway, and mounting said runway for movement transversely of itself along said rail; a U-shaped stirrup extended under said rail on the opposite side thereof from said roller means; and means supporting said stirrup on said runway.

17. In combination with a support, a vehicle rack comprising a pair of spaced, axially aligned, horizontal front cylindrical rails mounted on the support; a pair of lift arms having front ends pivotally mounted on said support for elevational pivotal movement of said arms in transversely spaced, parallel planes about a common horizontal axis in rearwardly spaced parallel relation to said front rails; a rear cylindrical rail rigidly interconnecting said arms in parallel relation to said front rails for movement with said arms in an arcuate path concentric with said common axis toward and away from said front rail; a tubular lift bar rigidly interconnecting said lift arms in spaced parallel relation between said real rail and said common axis; runways extended transversely above said front and rear rails in laterally spaced, substantially parallel relation to each other; pairs of front and rear rollers respectively rollably and releasably engaging said front and rear rails under said runways with said rollers on each rail being in transversely spaced relation to each other relative to said runway; means mounting said rollers on their superposed runways for limited axial movement longitudinally of said runways during elevational movement of said rear rail, one of said mounting means on each runway being adjustable for moving the axis of its respective roller toward and away from the corresponding runway; and a lift ram borne by said support and connected to said lift bar for elevationally adjusting said runways between an elevated level position and a lowered position downwardly declined from said front rail.

18. In a vehicle supporting rack, an elongated rail having an upper convex surface, means mounting said rail in a substantially horizontal position, a runway extending transversely of and above said rail, a roller having an axis of rotation and concave surface of revolution circumscribing said axis, and means mounting said roller on said runway with its axis longitudinally of the runway and with said surface of revolution in complementary engagement with said rail whereby the runway is mounted for substantially horizontal movement with the roller rolling on the rail and for elevational movement with said roller moving circumferentially of the longitudinal axis of the rail.

19. In a vehicle supporting rack, an elongated rail having an upper convex surface, means mounting said rail in a substantially horizontal position, a runway extending transversely of and above said rail, a roller having an axis of rotation and a concave surface of revolution circumscribing said axis, and spaced brackets rotatably mounting said roller on said runway with its axis longitudinally of the runway and with said surface of revolution in complementary engagement with said rail whereby the runway moves substantially horizontally when the roller rolls on the rail and elevationally when said roller slides on said rail circumferentially of the longitudinal axis of the rail, said roller being mounted for axial movement between said brackets to accommodate skewable movement of said runway.

20. In a vehicle supporting rack, a pair of substantially parallel runways, means mounting each of said runways for pivotal movement about a substantially horizontal axis extended transversely of the runways between a substantially level position and an inclined position, said means also mounting each runway for transverse movement toward and away from the other runway and independently of the other runways so that one runway can remain stationary while the other runway moves toward and away from the stationary runway, and lift means for unitarily moving said runways between said level and inclined positions and for accommodating said independent transverse movement of the runways, said mounting means and said lift means also accommodating unitary transverse movement of said runways when a vehicle is supported on said runways.

21. In a vehicle supporting rack, a pair of substantially parallel runways each having opposite, longitudinally spaced, mounting and elevating end portions, first means supporting the mounting end portions of said runways for guided movement of said mounting end portions along a first predetermined substantially horizontal rectilinear line of travel extending transversely of said runway and for elevationally adjustable movement of said runways about said first line of travel as an axis, second means supporting the elevating end portions of said runways for guided movement of said elevating end portions along a second predetermined substantially horizontal rectilinear line of travel substantially parallel to said first line of travel, said first and second means thereby constraining said runways to move with substantially translational movement as they move along said paths, and powered lift means for raising and lowering said second means thereby to elevationally adjust said runways about said first line of travel.

22. In a rack for supporting a vehicle, said rack being mountable on a supporting surface such as a floor, front rail means, means mounting said rail means in substantially horizontal position and in vertically spaced relation to said supporting surface, rear rail means, means parallel relation to said front rail means and for elevational movement between an upper position in a common substantially horizontal plane with said front rail means and a lower position below said upper position, a pair of generally parallel runways having front and rear end portions projecting over said front and rear rail means respectively, and means on said front and rear end portions of each runway bearing on said rail means and constraining said runways to substantially translational movement along said rail means, said rail means and said bearing means on said rear end portion cooperating to accommodate said elevational movement.

23. The rack of claim 22 wherein said bearing means are rollers having their axis disposed lengthwise of said runways.

24. In an adjustable vehicle supporting rack, a pair of support rails having upper convex surfaces concentric with longitudinal axis for their respective rails, means supporting said rails in axially spaced substantially parallel relation to each other and in substantially horizontal positions, a pair of runways extended transversely of and over said rails, rollers having concave surfaces of revolution concentrically circumscribing individual axes for the rollers and rollably engaging the concave surfaces of said rails, and means journaling pairs of said rollers on each runway in longitudinally spaced relation therealong for rotation about their individual axes and for limited movement of each roller lengthwise of its runway thereby mounting said runways on said rails for movement thereon in a direction extending transversely of said runways and thereby permitting skewing of each runway about an upstanding axis.

25. A vehicle supporting rack comprising a pair of elongated support rails, each rail having an upper convex surface concentric with its longitudinal axis, means supporting said rails and axially spaced, substantially parallel relation to each other and in substantially horizontal positions, means mounting one of said rails for elevational movement in a vertical arc whereby said one rail moves relative to the other rail, an elongated runway extended transversely over said support rails, a plurality of shafts, means mounting said shafts on said runway over said support rails and in substantially parallel relation to said runway, and roller engaging said rails and being journaled on said shafts for rotation therearound and for movement axially thereof.

26. The combination of an elongated runway having opposite front and rear end portions, means pivotally supporting said front end portion of said runway for movement about a substantially horizontal front axis extended transversely of said runway, a rear rail extended transversely under said rear end portion of the runway in spaced substantially parallel relation to said front axis, a roller rollably engaging said rail, said roller being journaled on said runway and movable longitudinally of said runway, and means mounting said rail for elevational movement along an arc having a radius of curvature less than the radius of the curvature of the arc of movement of said roller about said front axis as said runway is raised and lowered on said rail whereby said roller is moved longitudinally of said runway incident to said elevational movement thereof.

27. A vehicle lifting apparatus comprising a pair of elongated vehicle supporting runways; means mounting said runways for elevational pivotal movement about a substantially horizontal pivot axis extended transversely of said runways; a base; a pair of lift arms individually located below and adjacent to said runways and in transversely spaced relation to each other, said lift arms being mounted on said base for elevational pivotal movement about axes substantially parallel to said pivot axis of the runways; means supporting said runways on said lift arms; and lift means for pivoting said arms about their axes.

28. A vehicle lifting apparatus comprising a pair of vehicle supporting runways having front and rear end portions; means mounting the front end portions of said runways of elevational pivotal movement of said runways about a substantially horizontal front pivot axis extended transversely of said runways; a base; a pair of lift arms individually located below and adjacent to said runways and in transversely spaced relation to each other, said lift arms being mounted on said base for elevational pivotal movement about axes substantially parallel to said pivot axis of the runways; means supporting the rear end of portions of said runways on said lift arms; and lift means connected to said arms for pivoting said arms about their axes.

29. An adjustable vehicle lifting apparatus comprising a pair of vehicle supporting runways having front and rear end portions; means mounting the front end portions of said runways for elevational pivotal movement of said runways about a substantially horizontal front pivot axis extended transversely of said runways and for movement of said runways transversely relative to each other; a base; a pair of lift arms individually located below and adjacent to said runways and in transversely spaced relation to each other, said lift arms being mounted on said base for elevational pivotal movement about axis substantially parallel to said pivot axis of the runways; a rigid cross member rigidly interconnecting said arms and extended transversely of and beneath the rear end portions of said runways in substantially parallel relation to said front axis; means supporting the rear end portions of said runways on said cross member for movement of said runways along said cross member; and lift means connected to said arms for pivoting said arms about their axes.

30. In combination with a support, a vehicle rack comprising front axis means mounted on the support; a pair of lift arms having front ends pivotally mounted on said support for elevational pivotal movement on said arms in transversely spaced, parallel planes about a common horizontal axis in rearwardly spaced parallel relation to said front axis means; a rear mounting member rigidly interconnecting said arms in substantially parallel relation to said front axis means for movement with said arms in an arcuate path concentric with said common axis toward and away from said front axis means; a tubular lift bar rigidly interconnecting said lift arms; runways pivoted on said front axis means and supported on said rear mounting member in laterally spaced, substantially parallel relation to each other; means for raising and lowering said lift bar for elevationally adjusting said runways between an elevated position and a lowered position downwardly declined from said front axis means; a shaft extended through said lift bar and having opposite ends rotatably received in said arms; safety legs radially extended from said shaft in a common plane for gravitational movement from a retracted position extended along said arms when said runways are in their lower positions into runway supporting positions extended downward from said lift arm for engagement with said support when said runways are in their level position.

31. In a vehicle supporting rack, a rail means mounting said rail in a substantially horizontal position, a runway disposed transversely of said rail, a roller having an axis of rotation and a channeled surface circumscribing said axis, and means mounting said roller on said runway with its axis disposed longitudinally of the runway and with said surface in complementary engagement with said rail whereby the runway is mounted for substantially horizontal movement with the roller rolling on the rail and for elevational movement with said roller moving arcuately of the rail.

32. In a vehicle supporting rack, a rail, means mounting said rail in a substantially horizontal position, a runway extending transversely of and above said rail, a roller having an axis of rotation and a channeled surface circumscribing said axis, means mounting said roller on said runway with its axis disposed longitudinally of the runway and with said surface in engagement with said rail whereby the runway is mounted for substantially horizontal movement with the roller rolling on the rail and for elevational movement with said roller moving circumferentially of the longitudinal axis of the rail, and means for resisting movement of said runway relative to said rail.

33. The rack of claim 32 wherein said resisting means engages the rail in circumferentially spaced relation to the roller in order to frictionally grasp said rail between said roller and said resisting means.

34. In a vehicle supporting rack, a rail having an upper convex surface, means mounting said rail in a substantially horizontal position, a runway extending transversely of and above said rail, a roller having an axis of rotation and a concave surface of revolution circumscribing said axis, and means rotatably mounting said roller on said runway with its axis disposed longitudinally of the runway and with said surface of revolution in complementary engagement with said rail whereby the runway is mounted for substantially horizontal and elevational movement, said roller rolling on said rail during said horizontal movement and moving circumferentially of the longitudinal axis of the rail during said elevational movement, said means also mounting said roller for movement lengthwise of the runway.

35. The rack of claim 22 including means for preventing movement of the runways along the rail means.

36. In a vehicle supporting rack, an elongated rail having an upper convex surface, means mounting said rail in a substantially horizontal position, a runway extending transversely of and above said rail, a roller having an axis of rotation and a surface of revolution circumscribing said axis, and means mounting said roller on said runway with its axis longitudinally of the runway and with said surface of revolution in engagement with said rail whereby the runway is mounted for substantially horizontal movement with the roller rolling on the rail and for elevational movement with said roller moving circumferentially of the longitudinal axis of the rail.

37. In a vehicle supporting rack, first and second substantially cylindrical rails, means mounting the rails in substantially parallel relation to each other and in substantially horizontal positions with the second rail at a lower elevation than the first rail, an inclined runway disposed transversely of the rails, a first pair of rollers mounted on the runway and having channeled surfaces engaging the first rail, a second pair of rollers mounted on the runway and having channelled surfaces engaging the second rail, all of the rollers having their axes of rotation disposed lengthwise of the runway so that the rollers mount the runway for movement along the rails, the channelled rollers bearing against the rails and preventing downward movement of the runway along the incline thereof, and means mounted on the runway and extending under each rail for releasably applying pressure against the rail to lock the runway against movement along the rails.

*38. In a vehicle supporting rack, a pair of elongate vehicle supporting runways having front and rear end portions, means mounting the front end portion of each runway for elevational pivotal movement about a substantially horizontal front pivot axis extending transversely of said runway, a lifting mechanism including a lift member with a contact surface disposed under each runway at a point spaced rearwardly from the front end portion of that runway, means mounting said lift member for vertical pivoting movement about a generally horizontal rear pivot axis spaced rearwardly from said front pivot axis, and a load-transmitting member disposed between each runway and the associated contact surface of said lift member, said load-transmitting member being in operative engagement with the runway and with the associated contact surface and mounted therebetween for movement longitudinally of said runway during simultaneous pivoting movement of said lift member and said runway about said rear axis and said front axis respectively.*

*39. The apparatus of claim 38 wherein said load-bearing member includes a plurality of anti-friction bearing members.*

*40. The apparatus of claim 38 wherein said lift member includes a lever disposed adjacent each runway for pivoting about said rear axis.*

*41. The apparatus of claim 38 wherein said lift member includes a lever disposed adjacent each runway, each lever having one end portion mounted for pivoting about said rear axis and its opposite end in supporting engagement with said load-bearing member.*

*42. A vehicle rack for supporting a vehicle in spaced relation above a support surface such as a garage floor for servicing the vehicle, said rack comprising a pair of elongate vehicle supporting runways having front and rear end portions, means mounting the front end portion of each runway for elevational pivotal movement about a substantially horizontal front pivot axis elevated above the support surface and extending transversely of the*

*runway, a lifting lever pivotally connected to each runway and disposed between the runway and the support surface, each lever having one end mounted for pivoting about a substantially horizontal rear pivot axis disposed rearwardly from said front pivot axis and a distal end mounted for movement longitudinally of the associated runway, and power means operatively connected to each lifting lever to pivot said lever about said rear pivot axis, the longitudinal movement of the distal end of the lever being effective to permit said lever to apply an upward lifting force to the runway as said lever pivots.*

*43. A vehicle lifting apparatus comprising a pair of elongated vehicle supporting runways; means mounting said runways for elevational pivotal movement about a substantially horizontal pivot axis extending transversely of said runways; a pair of lift units, each unit being located below and adjacent one of said runways and in transversely spaced relation to the other unit, each lift unit including a contact member underlying and in contact with the associated runway and including lever means connected to said contact member, said lever means being mounted for elevational pivotal movement about an axis substantially parallel to the pivot axis of the runway and spaced rearwardly therefrom; and power means for pivoting said lever means to raise the runway, said lever means having an end portion movable longitudinally of said runway as the runway is swung upwardly by said lever means.*

References Cited

The following references, cited by the Examiner, are of record in the patented file of this patent or the original patent.

UNITED STATES PATENTS

| | | | |
|---|---|---|---|
| 1,017,749 | 2/1912 | Gunther | 187—8.71 |
| 1,100,011 | 6/1914 | Darby et al. | 187—8.71 |
| 1,525,447 | 2/1925 | Hose | 269—58 |
| 1,955,586 | 4/1934 | Hott et al. | 187—8.52 |
| 1,973,803 | 9/1934 | Frauen | 269—58 |
| 2,025,051 | 12/1935 | Haucke | 33—203.12 |
| 2,168,624 | 8/1939 | Musgrave | 187—8.67 |
| 2,456,646 | 12/1948 | Patterson | 187—8.49 |
| 2,567,335 | 9/1951 | Hebert. | |
| 2,569,982 | 10/1951 | Estel | 187—8.52 |
| 2,592,919 | 4/1952 | Loomis et al. | 14—71 |
| 2,643,162 | 6/1953 | Barr | 308—6 |
| 2,758,385 | 8/1956 | Martin | 33—203.12 |
| 2,892,513 | 6/1959 | Carrigan | 187—8.43 |
| 2,903,047 | 9/1959 | Funyak | 248—430 |
| 2,928,701 | 3/1960 | Ferdig | 308—190 |
| 2,956,645 | 10/1960 | Halstead | 187—8.67 |
| 2,962,980 | 12/1960 | Carrigan | 187—8.67 |
| 3,018,496 | 1/1962 | Hosbein | 14—71 |

FOREIGN PATENTS

| | | |
|---|---|---|
| 113,610 | 5/1926 | Switzerland. |

EVON C. BLUNK, *Primary Examiner.*

H. C. HORNSBY, *Assistant Examiner.*

UNITED STATES PATENT OFFICE
CERTIFICATE OF CORRECTION

Reissue No. 26,232 June 27, 1967

Melvin H. Lill

It is hereby certified that error appears in the above numbered patent requiring correction and that the said Letters Patent should read as corrected below.

Column 16, line 52, strike out "opposite to each rail are"; column 19, line 47, before "parallel" insert -- mounting said rear rail means in spaced substantially --.

Signed and sealed this 29th day of October 1968.

(SEAL)
Attest:

Edward M. Fletcher, Jr.
Attesting Officer

EDWARD J. BRENNER
Commissioner of Patents